(12) United States Patent
Blyumen et al.

(10) Patent No.: US 9,870,129 B2
(45) Date of Patent: Jan. 16, 2018

(54) METHOD AND SYSTEM FOR RECONFIGURING A MULTIDIMENSIONAL INTERFACE USING DIMENSION TILES

(71) Applicant: Oracle International Corporation, Redwood Shores, CA (US)

(72) Inventors: Julia Blyumen, Scotts Valley, CA (US); John Cartan, Alameda, CA (US); Dan Zhou, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 512 days.

(21) Appl. No.: 14/310,626

(22) Filed: Jun. 20, 2014

(65) Prior Publication Data

US 2014/0380210 A1 Dec. 25, 2014

Related U.S. Application Data

(60) Provisional application No. 61/838,054, filed on Jun. 21, 2013, provisional application No. 61/838,056, filed on Jun. 21, 2013.

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0485* (2013.01); *G06F 3/04842* (2013.01); *G06F 17/30867* (2013.01); *G06F 17/30893* (2013.01)

(58) Field of Classification Search
CPC .......... G06F 17/30595; G06F 17/3089; G06F 3/0482; G05B 15/02; G05B 2219/2642
See application file for complete search history.

(56) References Cited

U.S. PATENT DOCUMENTS

| | | |
|---|---|---|
| 6,448,987 B1 | 9/2002 | Easty et al. |
| 6,750,864 B1 | 6/2004 | Anwar |

(Continued)

OTHER PUBLICATIONS

Non-final Office Action dated Feb. 28, 2014 for U.S. Appl. No. 13/569,700.

(Continued)

*Primary Examiner* — Jeffrey A Gaffin
*Assistant Examiner* — Justin Lee
(74) *Attorney, Agent, or Firm* — Vista IP Law Group, LLP

(57) ABSTRACT

A method, system, and computer program product for human-machine interface devices. Embodiments commence upon receiving a set of dimensions, at least some of the dimensions having a plurality of dimension values, then generating for display, a first interactive user interface comprising a series of dimension tiles corresponding to the set of dimensions. A second interactive user interface comprising at least some of the dimensions is displayed in tandem such that a user interaction upon the first interactive user interface causes a change in the second interactive user interface. The dimension tiles can be used in configuration operations such that upon receiving a user interaction upon the dimension tiles, the change in configuration is reflected over the second interactive user interface.

20 Claims, 35 Drawing Sheets
(19 of 35 Drawing Sheet(s) Filed in Color)

(51) Int. Cl.
*G06F 3/0485* (2013.01)
*G06F 17/30* (2006.01)

(56) References Cited

U.S. PATENT DOCUMENTS

| | | | |
|---|---|---|---|
| 8,332,782 | B1 | 12/2012 | Chang et al. |
| 2003/0197740 | A1 | 10/2003 | Reponen |
| 2004/0236714 | A1 | 11/2004 | Eisenberger |
| 2005/0246331 | A1* | 11/2005 | De Vorchik ....... G06F 17/30235 |
| 2006/0161871 | A1 | 7/2006 | Hotelling |
| 2007/0005477 | A1 | 1/2007 | McAtamney |
| 2007/0123204 | A1 | 5/2007 | Inukai |
| 2007/0198949 | A1 | 8/2007 | Rummel |
| 2007/0250793 | A1 | 10/2007 | Miura et al. |
| 2007/0268300 | A1 | 11/2007 | Janet |
| 2008/0059913 | A1 | 3/2008 | Burtner et al. |
| 2008/0215978 | A1* | 9/2008 | Bamba .................. G06F 3/0482 715/713 |
| 2008/0250021 | A1 | 10/2008 | Boys |
| 2009/0164387 | A1 | 6/2009 | Armstrong |
| 2010/0011304 | A1 | 1/2010 | Van Os |
| 2010/0131881 | A1* | 5/2010 | Ganesh ............. G06F 17/30994 715/769 |
| 2010/0156889 | A1 | 6/2010 | Martinez |
| 2010/0253686 | A1 | 10/2010 | Alsbury |
| 2011/0047014 | A1 | 2/2011 | De Angelo |
| 2011/0219324 | A1 | 9/2011 | Watanabe |
| 2012/0079427 | A1* | 3/2012 | Carmichael ......... G06F 3/04817 715/825 |
| 2012/0110096 | A1 | 5/2012 | Smarr et al. |
| 2012/0110458 | A1 | 5/2012 | Brown |
| 2012/0117476 | A1 | 5/2012 | Siegrist |
| 2012/0221954 | A1* | 8/2012 | Tanaka .................... H04L 41/22 715/736 |
| 2012/0240064 | A1 | 9/2012 | Ramsay |
| 2013/0019173 | A1 | 1/2013 | Kotler et al. |
| 2013/0103701 | A1* | 4/2013 | Vishnubhatta .... G06F 17/30595 707/754 |
| 2013/0223614 | A1 | 8/2013 | Tuchman |
| 2013/0239012 | A1* | 9/2013 | Barak ................. G06F 17/3089 715/744 |
| 2014/0325600 | A1 | 10/2014 | Odenheimer |

OTHER PUBLICATIONS

Final Office Action dated Jun. 19, 2014 for U.S. Appl. No. 13/569,700.
"Hierarchy, n." OED Online. Oxford University Press, Jun. 2014. Web. Jun. 13, 2014.
"Hierarchy." Webster's New World & Trade; Computer Dictionary. Hobokcn: Wiley, 2003. Credo Reference. Web. Jun. 13, 2014.
Non-final Office Action dated Dec. 17, 2014 for U.S. Appl. No. 13/569,700.
"Flipboard for iPhone review", Dec. 2011, 9 pages, url: http://www.appsafari.com/news/17786/flipboard-for-iphone/.
Paul Greenberg, "Oracle Open World 2010: It All Works Out in the . . . " Social CRM: The Conversation, Sep. 27, 2010, 6 pages.
Kathy Miedema, "Oracle Fusion Applications CRM Helps Drive Sales with Sharp, Practical User Experience" Oralce, Usable Apps, Application User Experience, First Published: Dec. 30, 2011, Revised: Jun. 22, 2012, 3 pages.
Google finance, Jan. 6, 2013, 2 pages, url: http://www.google.com/finance?cid=419344.
"Mashups: The What and Why", Salesforce, Apr. 10, 2007, 4 pages, url: https://developer.salesforce.com/page/Mashups:_The_What_and_Why.
Adam Ostrow, "13 Must-See Google Maps Mashups", Mashable, Jul. 10, 2007, 12 pages, url: http://mashable.com/2007/07/10/googlc-maps-mashups-2/.
Housingmaps, 2 pages, Feb. 15, 2013, 2 pages, url: http://www.housingmaps.com/.
Final Office Action dated Apr. 7, 2016 for related U.S. Appl. No. 13/569,700.
Non-final Office Action dated Jun. 30, 2016 for related U.S. Appl. No. 14/310,561.
"Annular, adj.", OED Online. Dec. 2015. Oxford University Press. Http://www.oed.com/view/Entry/7964?redirectedFrom+annular (accessed Dec. 13, 2015).
Non-final Office Action dated Dec. 21, 2015 for related U.S. Appl. No. 13/569,700.
Final Office Action dated Jun. 9, 2015 for U.S. Appl. No. 13/569,700.
Advisory Action dated Feb. 10, 2017 for related U.S. Appl. No. 14/310,561.
Notice of Allowance and Fee(s) due dated Apr. 20, 2017 for related U.S. Appl. No. 14/310,561.
Final Office Action dated Oct. 25, 2016 for related U.S. Appl. No. 14/310,561.
Non-final Office Action dated Dec. 2, 2016 for related U.S. Appl. No. 14/310,591.
Advisory Action dated Jan. 9, 2017 for related U.S. Appl. No. 14/310,561.
Final Office Action dated Jun. 16, 2017 for related U.S. Appl. No. 14/310,591.

* cited by examiner

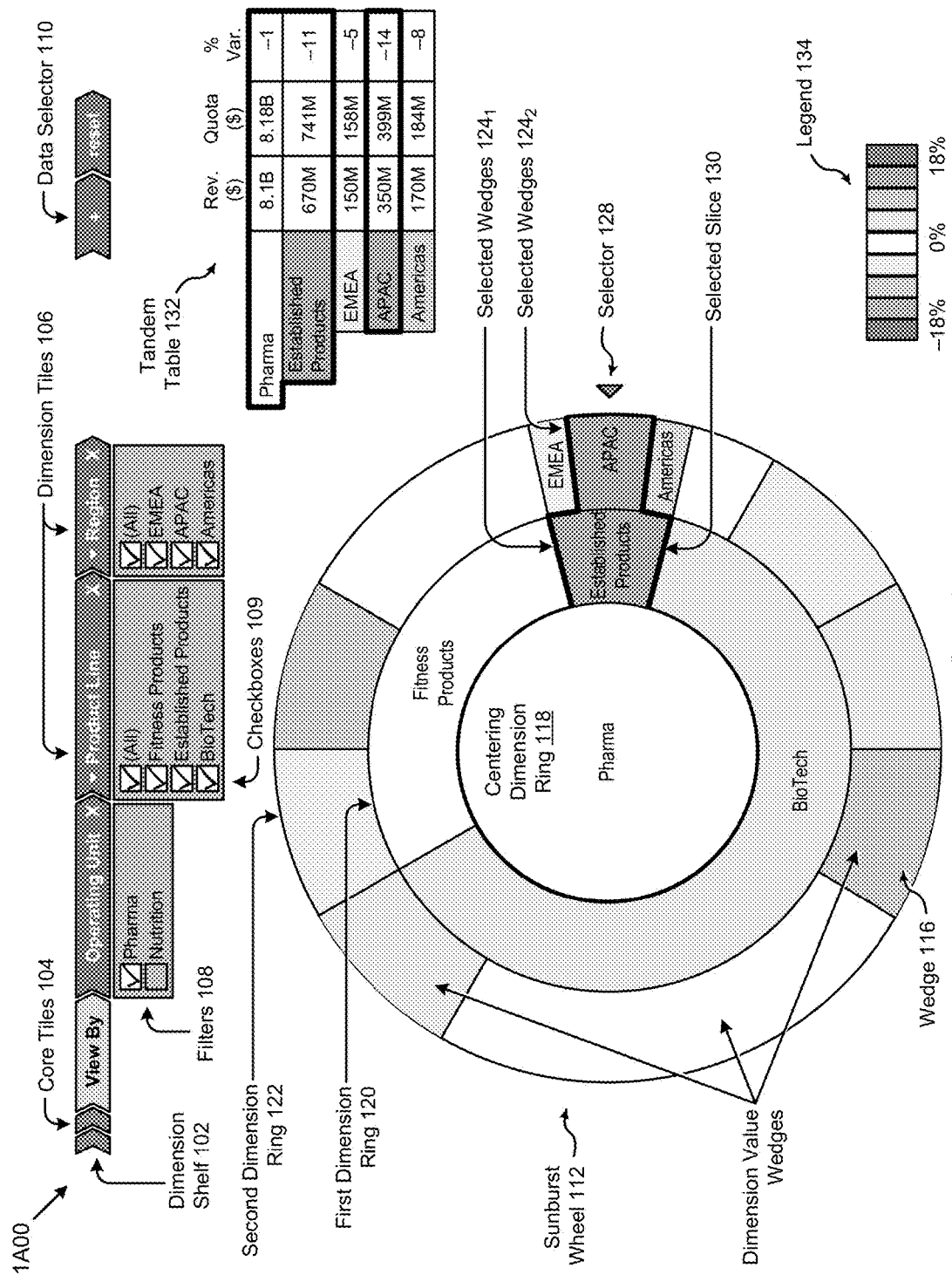

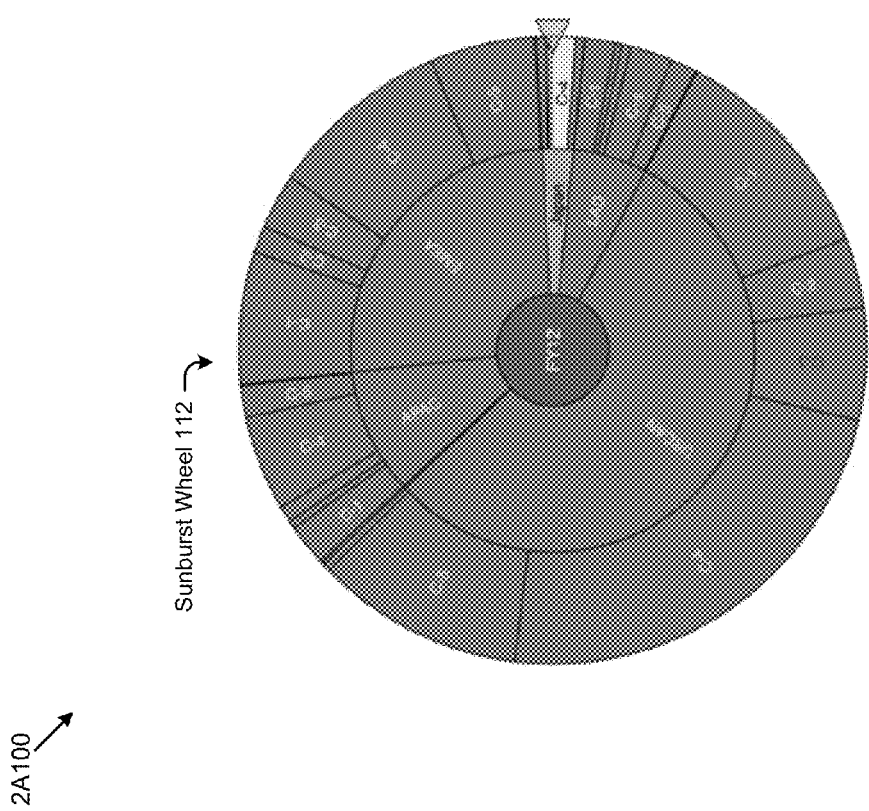
FIG. 2A1

2A200
Sunburst Wheel 112
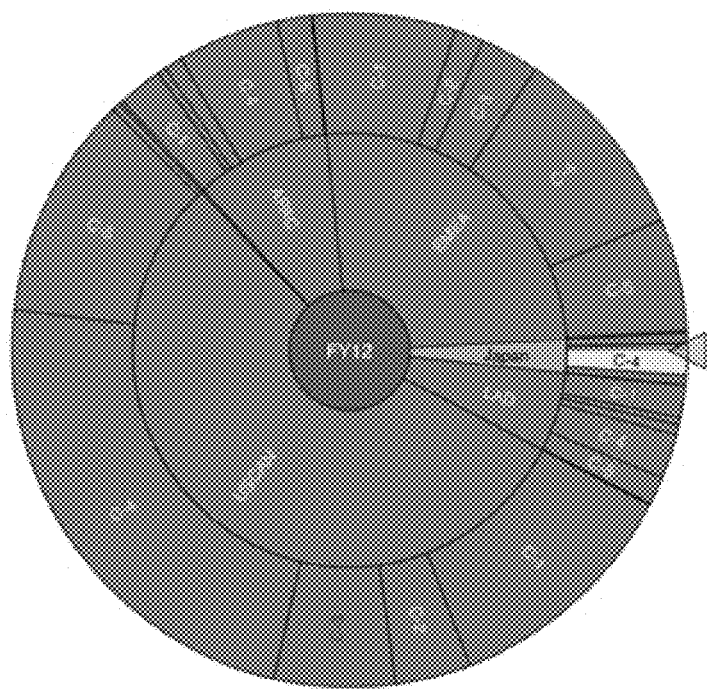
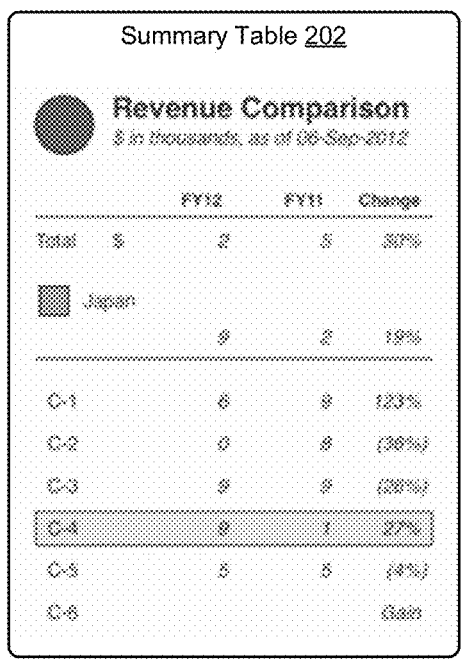
FIG. 2A2

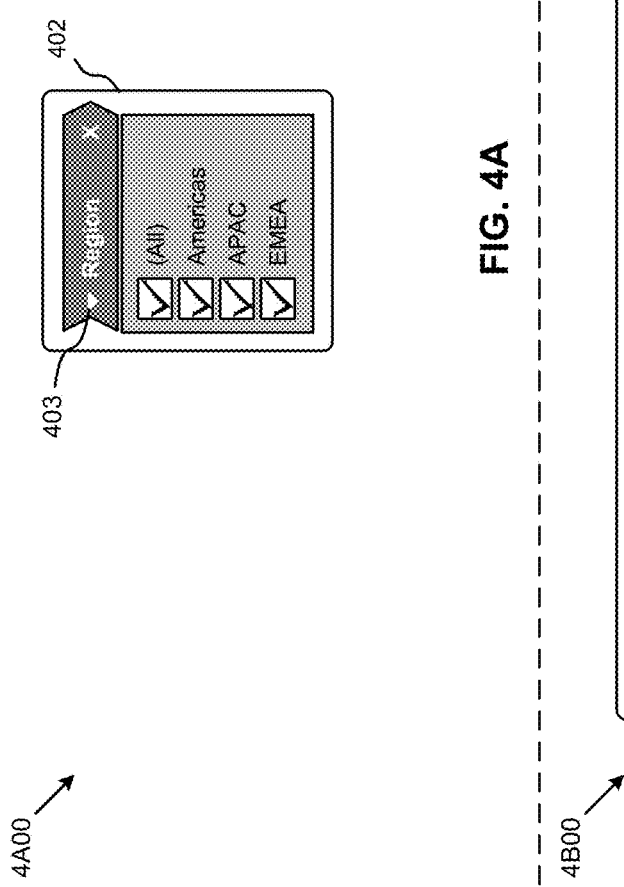

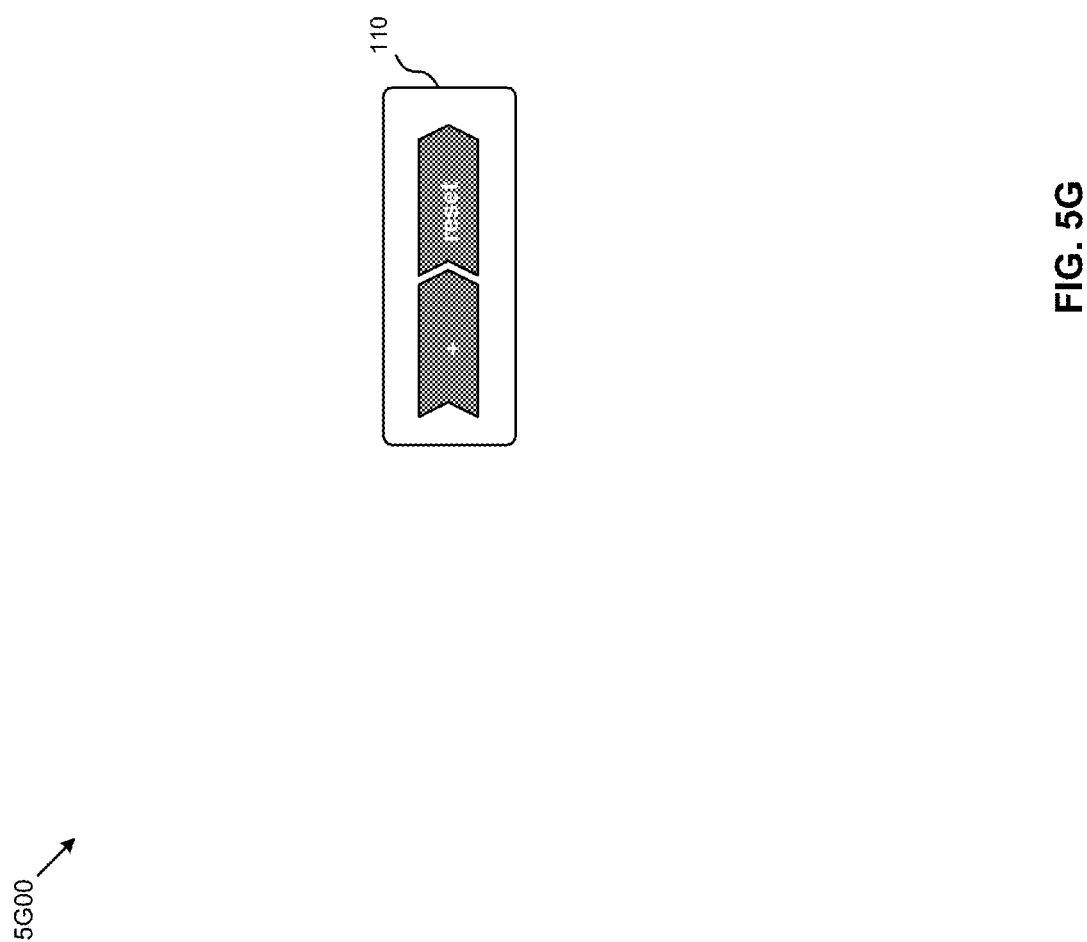

METHOD AND SYSTEM FOR RECONFIGURING A MULTIDIMENSIONAL INTERFACE USING DIMENSION TILES

RELATED APPLICATIONS

The present application claims the benefit of priority to U.S. Provisional Patent Application Ser. No. 61/838,054, entitled "METHOD AND SYSTEM FOR IMPLEMENTING AN INTELLIGENT ENTRY POINT FOR ENTERPRISE APPLICATIONS", filed Jun. 21, 2013; and the present application claims the benefit of priority to U.S. Provisional Patent Application Ser. No. 61/838,056 entitled "METHOD AND SYSTEM FOR IMPLEMENTING A SUNBURST INTERFACE", filed Jun. 21, 2013, both of which are hereby incorporated by reference in their entirety.

Further information is disclosed in a related U.S. patent application Ser. No. 14/310,561, entitled "A USER INTERFACE FOR RELATING ENTERPRISE INFORMATION WITH PUBLIC INFORMATION USING A PRIVATE USER PROFILE AND SCHEMA", filed on even date herewith and in related U.S. patent application Ser. No. 14/310,591, entitled "CONFIGURING AND DISPLAYING MULTIDIMENSIONAL DATA USING TWO OR MORE CORRELATED INTERACTIVE SCREEN INTERFACES", filed on even date herewith, each of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of human-machine interface devices and more particularly to techniques for configuring and displaying multidimensional data using interactive screen interfaces.

BACKGROUND

Modern computer users have access to many sources of information that can be collected and correlated together. Any suitable source may be used to acquire information that may be of interest to a user. In a business context, the information source will often include data from one or more business applications and, in some cases, suites of business applications. These applications are used to provide visibility and control over various aspects of the business. Such business applications (or, as they are sometimes called, "enterprise applications") can include, without limitation, customer relations management (CRM) applications, enterprise resource planning (ERP) applications, supply chain management applications, and other applications dealing with various finance, accounting, manufacturing, and/or distribution functions, to name but a few examples. Exemplary enterprise application suites include, without limitation, Oracle Fusion, Oracle eBusiness Suite, and JD Edwards Enterprise One, all of which are available from Oracle Corporation of Redwood Shores, Calif.

In recent years, business intelligence (BI) software has become increasingly important to large business enterprises and other organizations to review and access business information maintained by the organization. Business intelligence often comprises multidimensional data and provides current and historical views of business operations.

Various graphical user interfaces using user interface widgets have been designed to view multidimensional data (e.g., data that exist in business application systems). Unfortunately, such legacy approaches fail to provide controls so to provide interactive ordering and filtering of displayed dimensions, and/or to interactively add or interactively remove dimensions from the display, and/or to interactively filter a dimension based on a particular value found in a dimension.

What is needed is a technique or techniques for interactive reconfiguration of a multidimensional interface using interactive dimension- and filter-controlling widgets.

None of the aforementioned legacy approaches achieve the capabilities of the herein-disclosed techniques for configuring and displaying multidimensional data using order- and filter-controlling configuration widgets together with tandem interactive screen interfaces. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for configuring and displaying multidimensional data using tandem interactive screen interfaces.

Embodiments commence upon receiving a set of dimensions, at least some of the dimensions having a plurality of dimension values, then generating for display, a first interactive user interface comprising a series of dimension tiles corresponding to the set of dimensions. A second interactive user interface comprising at least some of the dimensions is displayed in tandem such that a user interaction upon the first interactive user interface causes a corresponding change in the second interactive user interface. The dimension tiles can be used in configuration operations such that upon receiving a user interaction upon the dimension tiles, the change in configuration is reflected over the second interactive user interface.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

FIG. 1A is an example of a sunburst wheel and tandem table used for configuring and displaying multidimensional data using tandem interactive screen interfaces, according to an embodiment.

FIG. 2A1 shows a landscape-oriented tandem interface with a sunburst wheel and tandem table for configuring and displaying multidimensional data using tandem interactive screen interfaces, according to some embodiments.

FIG. 2A2 shows a portrait-oriented tandem interface with a sunburst wheel and tandem table for configuring and displaying multidimensional data using tandem interactive screen interfaces, according to some embodiments.

FIG. 4A depicts a dimension tile filtering widget to implement filtering in systems supporting configuring and displaying multidimensional data using tandem interactive screen interfaces, according to some embodiments.

FIG. 4B depicts a selected dimension value filtering tile as implemented for configuring and displaying multidimensional data using tandem interactive screen interfaces, according to some embodiments.

FIG. 5G depicts sample usage of a data selector operator implemented using dimension tiles in systems for configuring and displaying multidimensional data using tandem interactive screen interfaces, according to some embodiments.

DETAILED DESCRIPTION

Figure 1B:
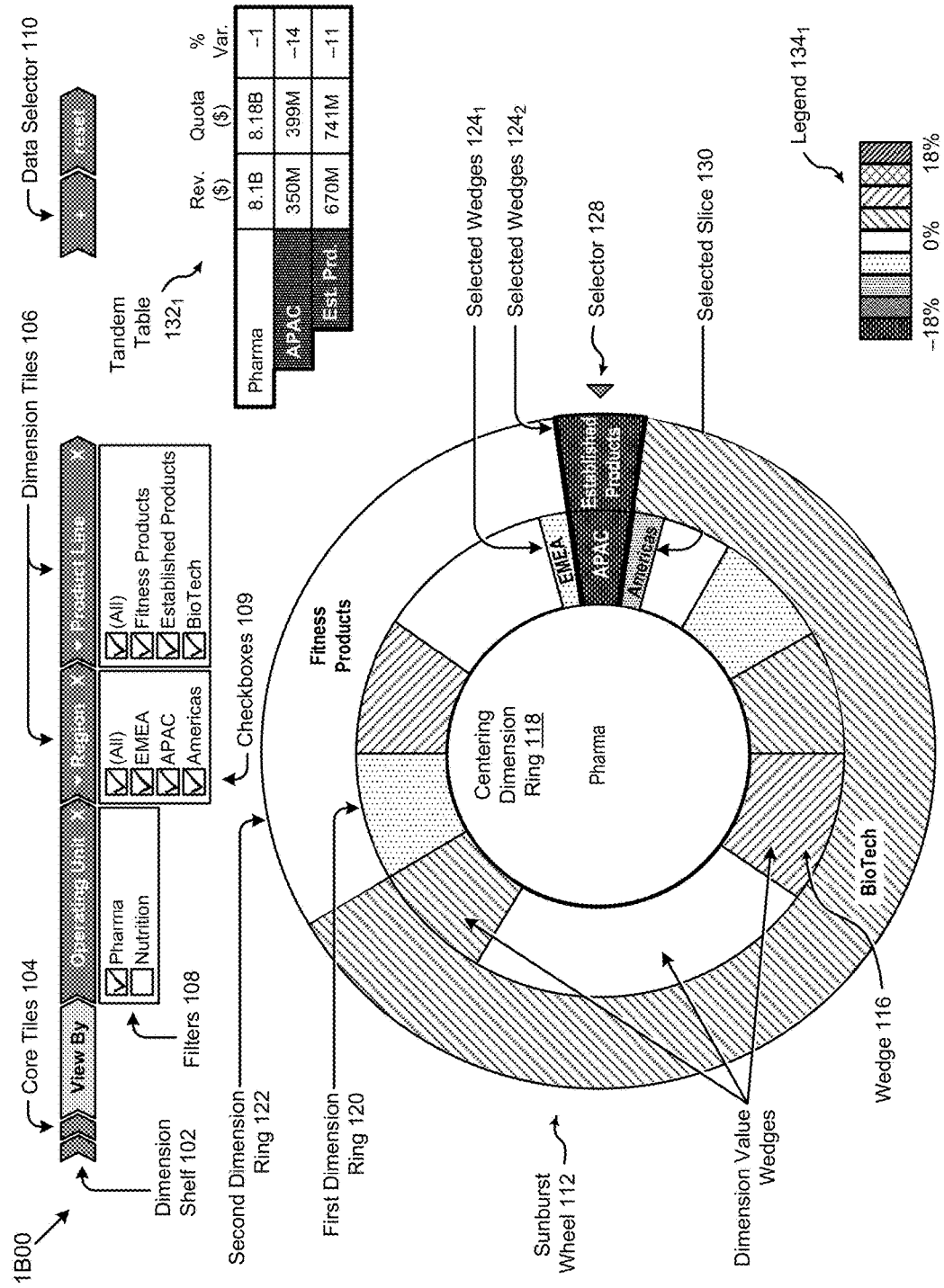
FIG. 1B is an example of a sunburst wheel and tandem table used for configuring and displaying multidimensional data using tandem interactive screen interfaces, according to another embodiment.

Disclosed herein and in the accompanying figures are exemplary environments, methods, and systems for configuring and displaying multidimensional data using tandem interactive screen interfaces.

Overview

The present disclosure teaches how to make and use tandem interfaces for exploring multidimensional data. Use of the herein-disclosed techniques promotes the use of interactive visualizations enabling users to spontaneously explore information. Some embodiments comprise an interactive sunburst interface having adjacent dimension tiles and having an adjacent table widget. Manipulations of adjacent dimension tiles and/or manipulations of the adjacent table widget facilitates spontaneous user-directed exploration of multidimensional data. An adjacent table widget is coupled to the adjacent sunburst so the data can be explored by direct manipulation of the sunburst widget (e.g., for coarse movements) and/or by direct manipulation of the dimension tile widgets (e.g., for dimension control and/or filtering) and/or by direct manipulation of the adjacent table widget (e.g., for fine movements).

Some embodiments comprise an interactive sunburst wheel-based interface having an adjacent table widget that enables users to spontaneously explore multidimensional data. The rings and slices on the sunburst wheel interface element show categories of information, while slice size and color show metric values. The tabular interface element simultaneously displays the information in a table format. User actions taken against either the sunburst wheel or tabular interface element will correspondingly occur as well to the other interface element.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A is an example 1A00 of a sunburst wheel and tandem table used for configuring and displaying multidimensional data using tandem interactive screen interfaces. As an option, one or more instances of example 1A00 or any aspect thereof may be implemented in the context of the architecture and functionality of the embodiments described herein. Also, the example 1A00 or any aspect thereof may be implemented in any desired environment.

As shown in FIG. 1A, the example comprises a sunburst interface. The sunburst interface includes a sunburst wheel 112, where levels of information are represented as dimension rings (e.g., a first dimension ring 120, a second dimension ring 122, and a centering dimension 118) and categories are represented as wedges 116 (e.g., wedge 116). The relative size (e.g., extent of its arc) of a wedge indicates the relative extent of value. A user can spin the sunburst wheel with a mouse cursor or by using a touch-enabled device. The selector 128 points to a selected slice 130, and any wedges that intersect the selected slice are thus selected (e.g., selected wedge $124_1$, selected wedge $124_2$).

Colors are used in the sunburst wheel, and correspondingly in the tandem table. In the example 100, colors are used to represent values (e.g., in a heat map), in this case the values range from 0% (red) through 200% (blue). A legend (e.g., the shown color legend 134) uses a set of colors from a particular color pallet, however any color pallet can be used. In some embodiments, patterns are is used to differentiate one dimension value (or range) from another dimension value (or range).

Adjacent to the sunburst wheel is a tandem table 132 showing the values (e.g., text values, numeric values) corresponding to the selected slice. As the user spins the sunburst wheel, successively aligning a slice across from the selector, the tandem table simultaneously scrolls through data, and highlights the value or values corresponding to the selected slice. In some cases, portions of the tandem table might list not only the selected wedge of the outermost ring, but also peer wedges as well (e.g., those wedges sharing the same parent wedge in a next inner ring). Moving a mouse cursor or finger left (or right) presents the sunburst wheel in a relatively larger (or relatively smaller) rendering. In this way, the sunburst wheel shows the overall shape and/or content of the data, while the table provides exact numeric values and category labels. The natural gestures enable data exploration with the speed of thought. The sunburst wheel and tandem table provides an efficient way to navigate very large tables. For example, navigation through large portions of the underlying data can be done via the sunburst wheel, and fine tuning can be done via the tandem table (e.g., by using a cursor or touch gesture to accomplish scrolling through rows in the tandem table). In some situations the extent of a particular slice of data might be small or very small, resulting in a small or very small slice, yet the exact numeric values and category labels appear on the tandem table. In still further cases multiple very small slices may be contiguous, and in such cases fine controls can be accomplished using the tandem table.

The sunburst interface widget comprises a sunburst wheel where levels of information are represented as rings and categories are represented as wedges. The relative size of a wedge indicates a category's relative value. A user can spin the sunburst wheel with a mouse cursor or a finger on touch-enabled devices. The selector points to a selected slice. Adjacent to the sunburst wheel is a table showing the numeric values of the selected slice. As the user spins the sunburst wheel, the table simultaneously scrolls. Moving a mouse cursor or a finger left to right makes the sunburst wheel larger.

The dimension shelf 102 contains dimension tiles 106. Each dimension tile corresponds to a ring on the sunburst wheel. The dimension tiles can be organized in an array (e.g., a linear array or a multidimensional array) and located in any convenient area in juxtaposition to the sunburst wheel. As shown, the dimension tiles 106 are organized onto a linear array forming a dimension shelf 102.

Figure 2B:
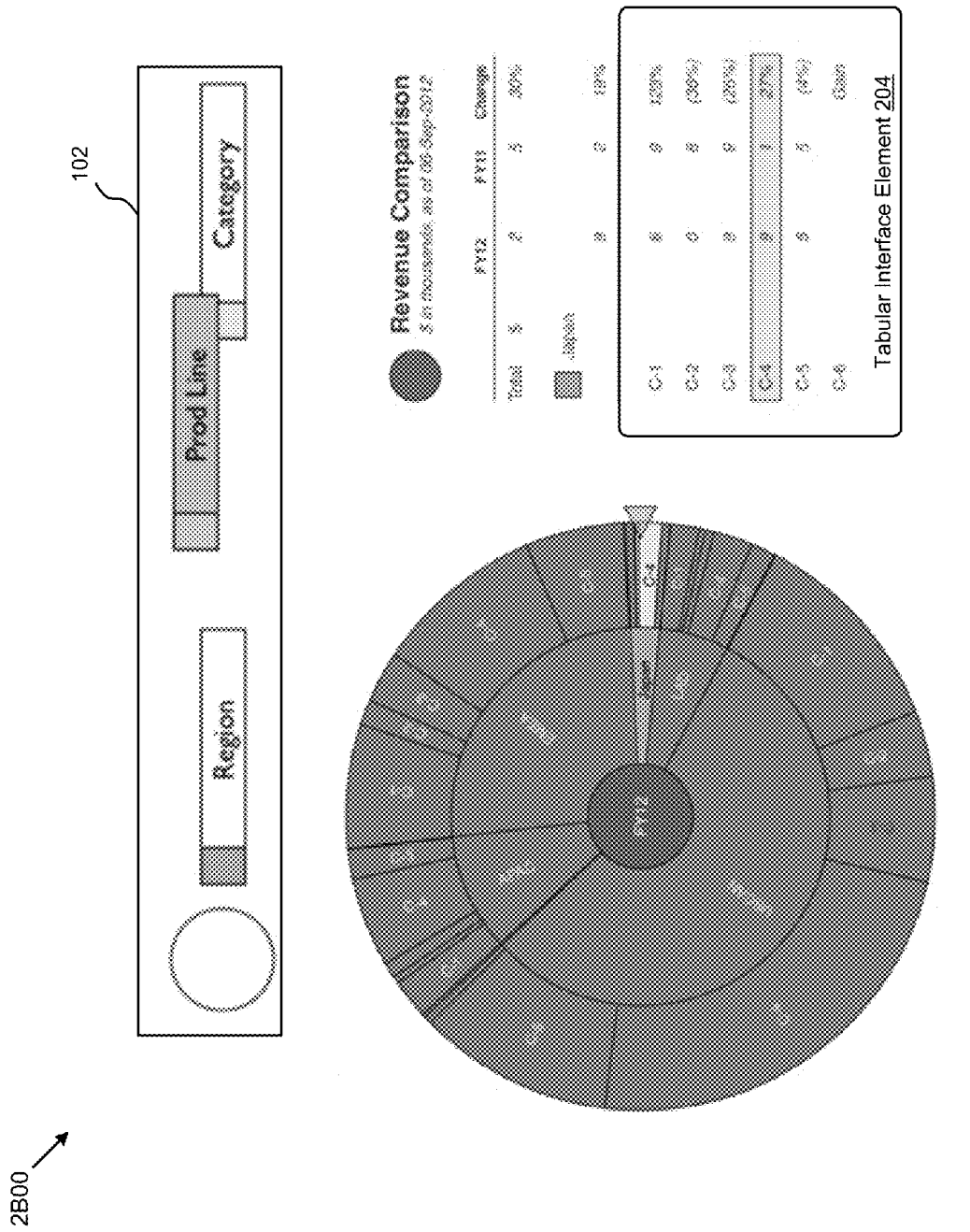
FIG. 2B shows a sample tandem interface with a sunburst wheel and dimension tile widgets for configuring and displaying multidimensional data using tandem interactive screen interfaces, according to some embodiments.
Figure 2C:
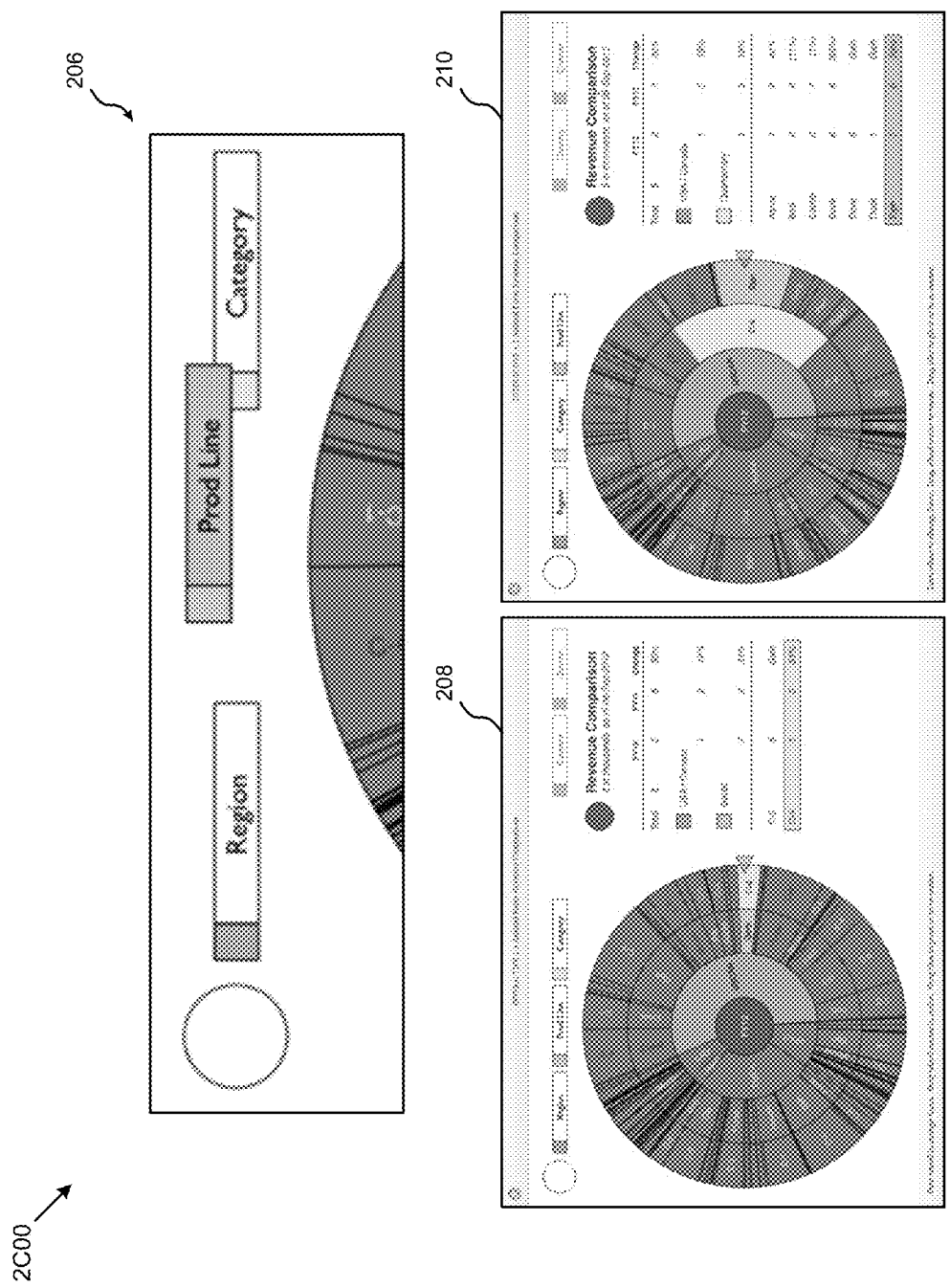
FIG. 2C depicts results of using a dimension reordering technique to reconfigure a sunburst wheel and its corresponding tabular interface elements as used in systems supporting configuring and displaying multidimensional data using tandem interactive screen interfaces, according to some embodiments.

Reordering the tiles reorders the rings on the sunburst wheel (e.g., see FIG. 1B and FIG. 2C). Dimension tiles can be added and removed from the shelf (e.g., see FIG. 2D). Tapping/clicking on a dimension tile shows the dimension values it contains (e.g., see filter screen interface 108). Using the dimension tiles, users can select categories to be shown or hidden in the sunburst wheel and its tandem table. This filters the wedges (categories) shown in each ring (dimension). For example, if a user selects (e.g., using checkboxes) only one value or category to be displayed, the entire corresponding ring of the sunburst wheel collapses and moves the dimension tile to the left (e.g., see core tiles 104). The same can be achieved by dragging the tile to the left. Users can restore the ring later by selecting additional categories.

As shown, an instance of a filter screen interface 108 is implemented using drop-down filter menus with checkboxes 109 for respective values found in the dimension of the corresponding dimension tile. Invoking a drop-down filter menu, and selecting (e.g., by indicating a check mark in a check box of the drop-down filter menu) has the effect of rendering the sunburst wheel of the corresponding dimension to display only those respective values.

Moving dimension tiles into a different order serves to reorder the dimensions of tandem interfaces. For example, ordering dimension tiles into a first order yields a corresponding first order in a tandem user interface. Then, ordering dimension tiles into a second order yields a corresponding second order in a tandem user interface. Variations of the ordering of dimension tiles between FIG. 1A and the following FIG. 1B depict one possible example.

FIG. 1B is an example 1B00 of a sunburst wheel and tandem table used for configuring and displaying multidimensional data using tandem interactive screen interfaces. As an option, one or more instances of example 1B00 or any aspect thereof may be implemented in the context of the architecture and functionality of the embodiments described herein. Also, the example 1B00 or any aspect thereof may be implemented in any desired environment.

Reordering the tiles reorders the rings on the sunburst wheel and in the tandem table $132_1$. Comparing with the foregoing FIG. 1A, the ordering of the tiles shown in FIG. 1B gives the order of core tiles as (left to right) "Operating Unit", "Region", and "Product Line". Various techniques for reordering and re-configuring multidimensional data for display in a first interactive user interface and/or in a second interactive user interface (e.g., a tandem table) are disclosed herein (e.g., see FIG. 2C).). A legend (e.g., the shown pattern legend $134_1$) uses a set of patterns from a particular pattern pallet, however any pattern pallet can be used. In some embodiments, patterns are is used to differentiate one dimension value or range from another dimension value or range.

FIG. 2A1 shows a landscape-oriented tandem interface 2A100 with a sunburst wheel and tandem table for configuring and displaying multidimensional data using tandem interactive screen interfaces. As an option, one or more instances of tandem interface 2A100 or any aspect thereof may be implemented in the context of the architecture and functionality of the embodiments described herein. Also, the tandem interface 2A100 or any aspect thereof may be implemented in any desired environment.

As shown in FIG. 2A1, the left portion of the interface contains the sunburst wheel interface element, which can be interactively rotated by the user to change the focus of the interface to highlight one or more data items/categories/dimensions. The right portion contains the summary table 202, which displays the data of interest in a table format. The shown orientation can be displayed on a smartphone or tablet device.

FIG. 2A2 shows a portrait-oriented tandem interface 2A200 with a sunburst wheel and tandem table for configuring and displaying multidimensional data using tandem interactive screen interfaces. As an option, one or more instances of tandem interface 2A200 or any aspect thereof may be implemented in the context of the architecture and functionality of the embodiments described herein. Also, the tandem interface 2A200 or any aspect thereof may be implemented in any desired environment.

As shown in FIG. 2A2, the top portion of the interface contains the sunburst wheel interface element, which can be interactively rotated by the user to change the focus of the interface to highlight one or more data items/categories/dimensions. The bottom portion contains the summary table 202, which displays the data of interest in a table format. The shown orientation can be displayed on a smartphone or tablet device.

FIG. 2B shows a sample tandem interface 2B00 with a sunburst wheel and dimension tile widgets for configuring and displaying multidimensional data using tandem interactive screen interfaces. As an option, one or more instances of tandem interface 2B00 or any aspect thereof may be implemented in the context of the architecture and functionality of the embodiments described herein. Also, the tandem interface 2B00 or any aspect thereof may be implemented in any desired environment.

As shown in FIG. 2B, the tandem interface comprises the tiles arranged on the dimension shelf 102, which tiles serve to identify the specific dimensions and their ordering that are included in the sunburst wheel interface and in any tabular interface element 204. The tiles can be dragged around within the shelf to reorganize the dimensions. FIG. 2C illustrates the process of dragging tiles to reorganize the dimensions on the sunburst wheel interface. Changing the order of the tiles on the corresponding shelf causes a change in the order of the rings on the sunburst wheel. This also changes the organization of the way the data is displayed in the tandem table interface.

FIG. 2C depicts results of using a dimension reordering technique 2C00 to reconfigure a sunburst wheel and its corresponding tabular interface elements as used in systems supporting configuring and displaying multidimensional data using tandem interactive screen interfaces. As an option, one or more instances of dimension reordering technique 2C00 or any aspect thereof may be implemented in the context of the architecture and functionality of the embodiments described herein. Also, the dimension reordering technique 2C00 or any aspect thereof may be implemented in any desired environment.

As shown in FIG. 2C, the dimension reordering technique comprises dragging tiles to reorder the selected dimensions from/to the sunburst wheel interface (see animation 206). The left presentation 208 shows a first ordering of dimensions in the wheel, and the right presentation 210 shows a second ordering of dimensions in the wheel.

Figure 2D:
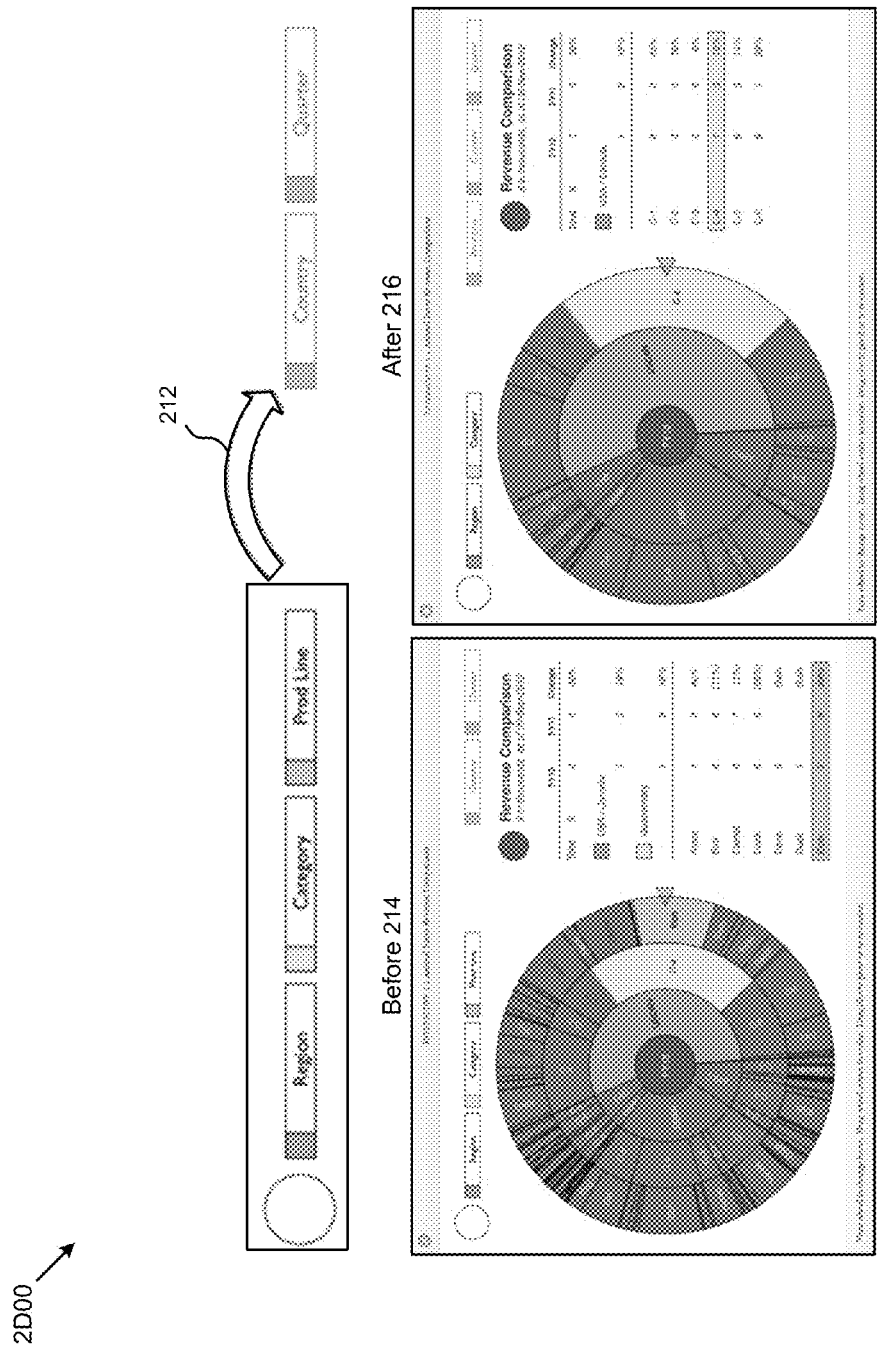
FIG. 2D depicts results of using a dimension elimination technique to reconfigure a sunburst wheel and its corresponding summary table as used in systems supporting configuring and displaying multidimensional data using tandem interactive screen interfaces, according to some embodiments.

FIG. 2D depicts results of using a dimension elimination technique 2D00 to reconfigure a sunburst wheel and its corresponding summary table as used in systems supporting configuring and displaying multidimensional data using tandem interactive screen interfaces. As an option, one or more instances of dimension elimination technique 2D00 or any aspect thereof may be implemented in the context of the architecture and functionality of the embodiments described herein. Also, the dimension elimination technique 2D00 or any aspect thereof may be implemented in any desired environment.

The dimension elimination technique of FIG. 2D depicts the process of dragging a tile off the shelf (e.g., see drag operation 212) to remove the dimension from the sunburst wheel. The dragging action operates on the wheel and tandem table. As shown, the presentation before drag 214 becomes the presentation after drag 216.

Figure 2E:
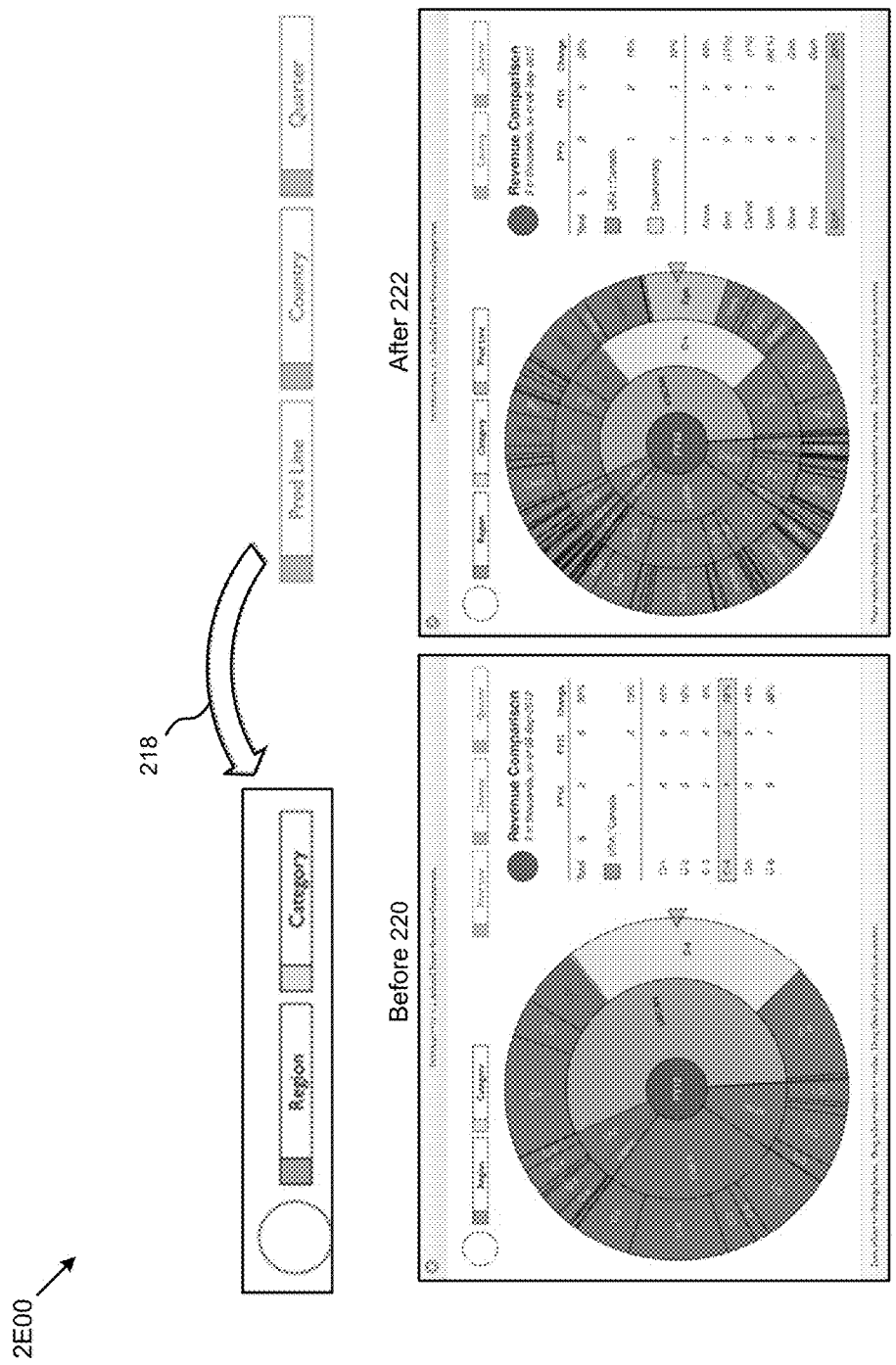
FIG. 2E depicts results of using a dimension inclusion technique to reconfigure a sunburst wheel and its corresponding summary table as used for configuring and displaying multidimensional data using tandem interactive screen interfaces, according to some embodiments.

FIG. 2E depicts results of using a dimension inclusion technique 2E00 to reconfigure a sunburst wheel and its corresponding summary table as used for configuring and displaying multidimensional data using tandem interactive screen interfaces. As an option, one or more instances of dimension inclusion technique 2E00 or any aspect thereof may be implemented in the context of the architecture and functionality of the embodiments described herein. Also, the dimension inclusion technique 2E00 or any aspect thereof may be implemented in any desired environment.

As shown in FIG. 2E, the dimension inclusion technique is implemented through the process of dragging a tile onto the shelf (e.g., see drag operation 218) to add a dimension to the sunburst wheel interface. The dragging action operates on the wheel and tandem table. As shown, the two ring presentation before drag 220 becomes the three ring presentation after drag 222.

Figure 2F:
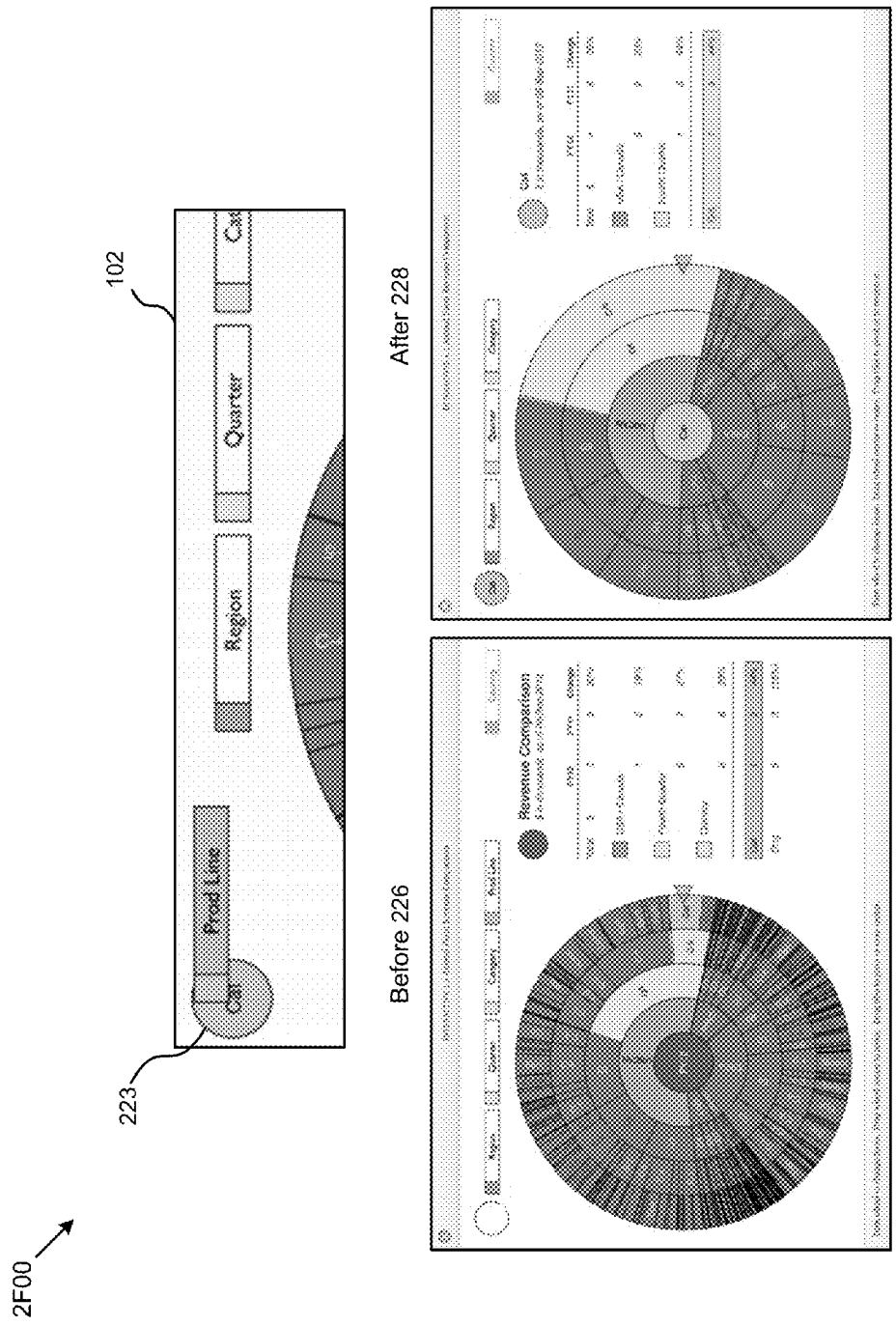
FIG. 2F depicts results of using a dimension centering technique to reconfigure a sunburst wheel and its corresponding summary table as used for configuring and displaying multidimensional data using tandem interactive screen interfaces, according to some embodiments.

FIG. 2F depicts results of using a dimension centering technique 2F00 to reconfigure a sunburst wheel and its corresponding summary table as used for configuring and displaying multidimensional data using tandem interactive screen interfaces. As an option, one or more instances of dimension centering technique 2F00 or any aspect thereof may be implemented in the context of the architecture and functionality of the embodiments described herein. Also, the dimension centering technique 2F00 or any aspect thereof may be implemented in any desired environment.

As shown in FIG. 2F, the dimension centering technique comprises dragging a tile into the circle portion of the dimension shelf to center the sunburst on a selected item in a given dimension. In the rendering shown as "Before 226", the sunburst comprises four rings; the outermost dimension is "Prod Line". The outermost ring is selected to item "Cat". In this example, the dimension centering technique 2F00 comprises dragging the "Prod Line" tile into the circle portion 223 of the dimension shelf to center the sunburst on the selected "Cat" item of the "Prod Line" dimension. The dragging action operates on the wheel and tandem table. As shown, the before drag presentation 226 becomes the after drag presentation 228.

Figure 2G:
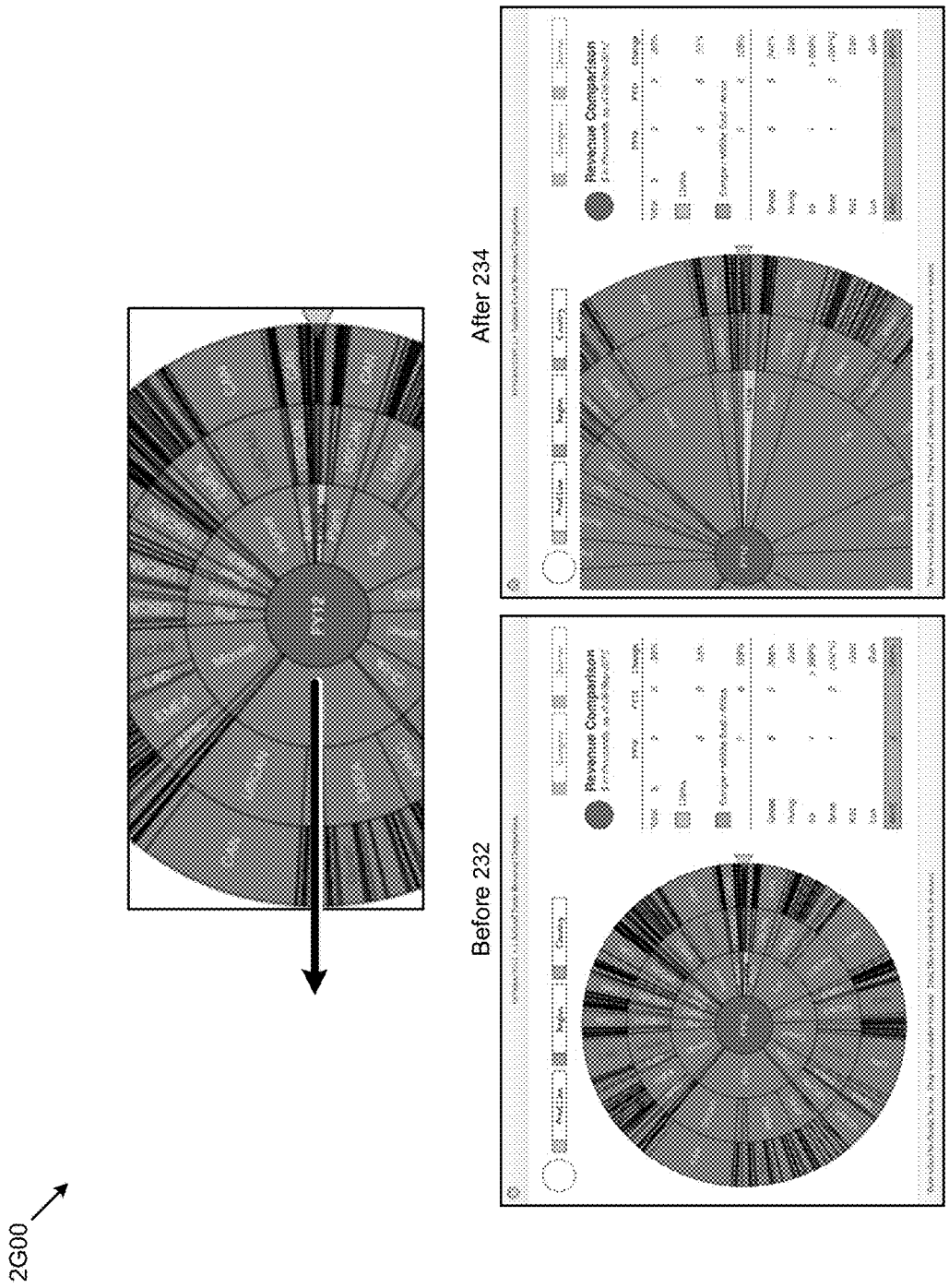
FIG. 2G depicts results of using a sunburst wheel enlargement technique to reconfigure a sunburst wheel and its corresponding summary table as used in systems supporting configuring and displaying multidimensional data using tandem interactive screen interfaces, according to some embodiments.

FIG. 2G depicts results of using a sunburst wheel enlargement technique 2G00 to reconfigure a sunburst wheel and its corresponding summary table as used in systems supporting configuring and displaying multidimensional data using tandem interactive screen interfaces. As an option, one or more instances of sunburst wheel enlargement technique 2G00 or any aspect thereof may be implemented in the context of the architecture and functionality of the embodiments described herein. Also, the sunburst wheel enlargement technique 2G00 or any aspect thereof may be implemented in any desired environment.

Figure 2H:
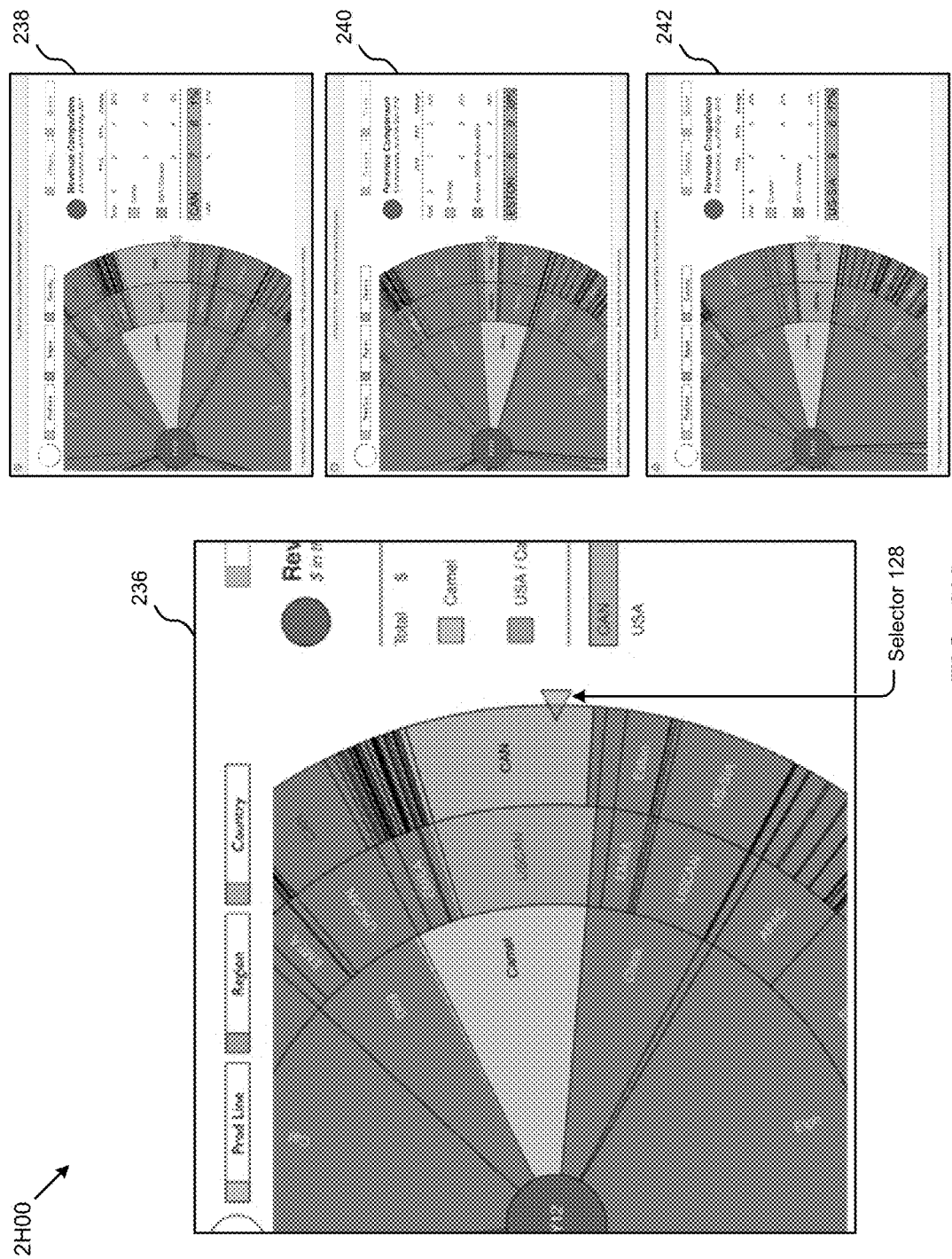
FIG. 2H depicts results of using a dimension focus technique to reconfigure a sunburst wheel and its corresponding summary table as used in systems supporting for configuring and displaying multidimensional data using tandem interactive screen interfaces, according to some embodiments.

As shown in FIG. 2G, the sunburst wheel enlargement technique comprises dragging the sunburst wheel (e.g., to the left) to enlarge the view of the interface, such as is illustrated in FIG. 2G. Specifically the rendering 232 is enlarged to generate the rendering 234. The edge of the sunburst wheel can rotated (e.g., by dragging in a semicircular motion) in either direction to rotate the sunburst wheel to a particular focus, as illustrated in FIG. 2H. Any suitable approach can be taken to manipulate the sunburst wheel, including using a computer mouse or a touchscreen.

FIG. 2H depicts results of using a dimension focus technique 2H00 to reconfigure a sunburst wheel and its corresponding summary table as used in systems supporting for configuring and displaying multidimensional data using tandem interactive screen interfaces. As an option, one or more instances of dimension focus technique 2H00 or any aspect thereof may be implemented in the context of the architecture and functionality of the embodiments described herein. Also, the dimension focus technique 2H00 or any aspect thereof may be implemented in any desired environment.

As shown in FIG. 2H, the dimension focus technique comprises rotating the sunburst wheel to focus onto a given topic, data item, or data category, etc. The sunburst wheel interface includes a selector 128 (e.g., a triangle or arrow) at the 3 o'clock position. The specific portion of the sunburst wheel that is rotated to fall within the range of the pointer element will be brought into focus. For example, positioning the wheel to "CAN" (see position 236 of FIG. 2J) will highlight "CAN" in the summary table (see position 238). Rotating the outer ring to another wedge (e.g., to "Eston") will highlight "Eston" in the summary table (see position 240), and further rotating the outer ring to another wedge (e.g., to "US-SIA") will highlight "US-SIA" in the summary table (see position 242).

Figure 2I:
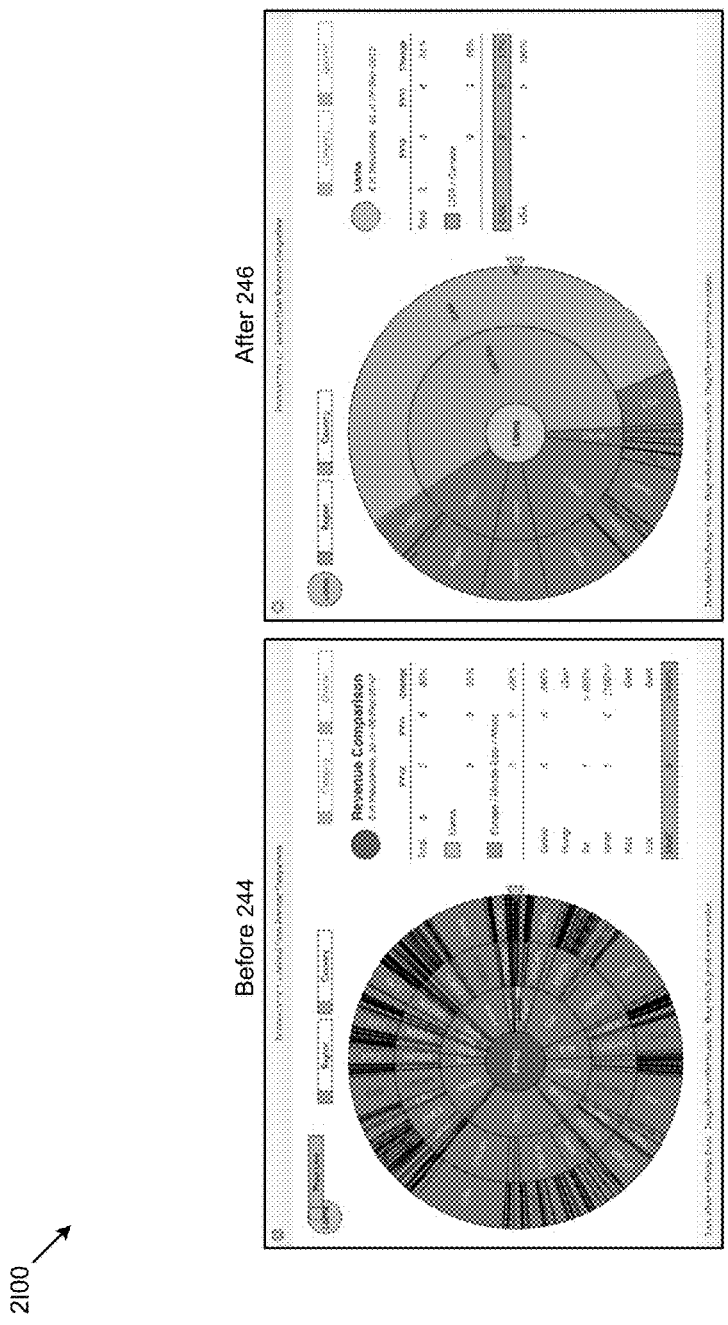
FIG. 2I shows iteration results using multiple operations to reconfigure a sunburst wheel and its corresponding summary table after configuring and displaying multidimensional data using tandem interactive screen interfaces, according to some embodiments.

FIG. 2I shows iteration results 2100 using multiple operations to reconfigure a sunburst wheel and its corresponding summary table after configuring and displaying multidimensional data using tandem interactive screen interfaces. As an option, one or more instances of iteration results 2100 or any aspect thereof may be implemented in the context of the architecture and functionality of the embodiments described herein. Also, the iteration results 2100 or any aspect thereof may be implemented in any desired environment.

As shown in FIG. 2I, the iterations may include a series of similar or different types of interactions performed upon the sunburst wheel (e.g., to focus the interface, to select dimensions, etc.). For example, the sunburst wheel can be rotated to bring a given category into focus. In a next operation, various different tiles can be dragged to select the specific dimensions and/or subdimensions to be displayed (e.g., in a particular order).

As shown the element "Llama" is a value of the dimension "Prod Line", and a first operation is initiated (see before image 244) so as to center the element "Llama" in the sunburst wheel. After the operation, the element "Llama" is centered, and the wheel corresponding to dimension "Prod Line" is eliminated (see after image 246). The remaining dimensions appear in the sunburst wheel, and the values are calculated based on the centered value. As shown, there are more "Llamas" sold in "CAN" than in any other "Country", and this is reflected in the relative size of "CAN" in the outer ring.

Figure 2J:
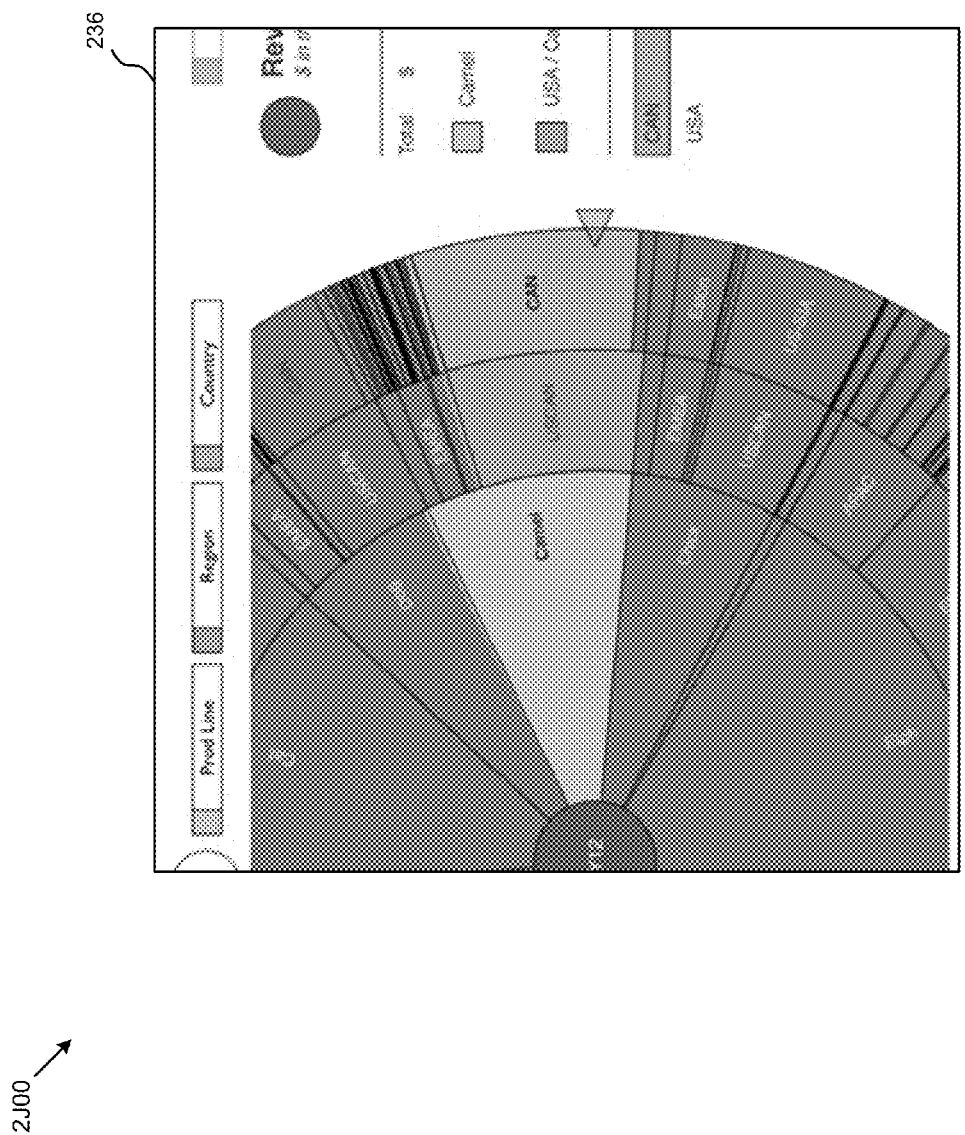
FIG. 2J depicts reconfiguring a sunburst wheel by dragging a dimension/element out of the dimension circle portion, according to some embodiments.

FIG. 2J depicts reconfiguring a sunburst wheel by dragging a dimension/element out of the dimension circle portion. As an option, one or more instances of dimension value representations 2J00 or any aspect thereof may be implemented in the context of the architecture and functionality of the embodiments described herein. Also, the dimension value representations 2J00 or any aspect thereof may be implemented in any desired environment.

As shown the reconfigured representation 2J00 comprises "Prod Line", "Region" and "Country". The "Prod Line" dimension was formerly within the dimension circle portion. As shown here, and in other embodiments, each dimension tile represents a dimension ring in the sunburst wheel. In this example, the left-to-right order of dimension tiles is "Prod Line", "Region" and "Country", and this order is represented in the order of the rings in the sunburst wheel.

Figure 2K:
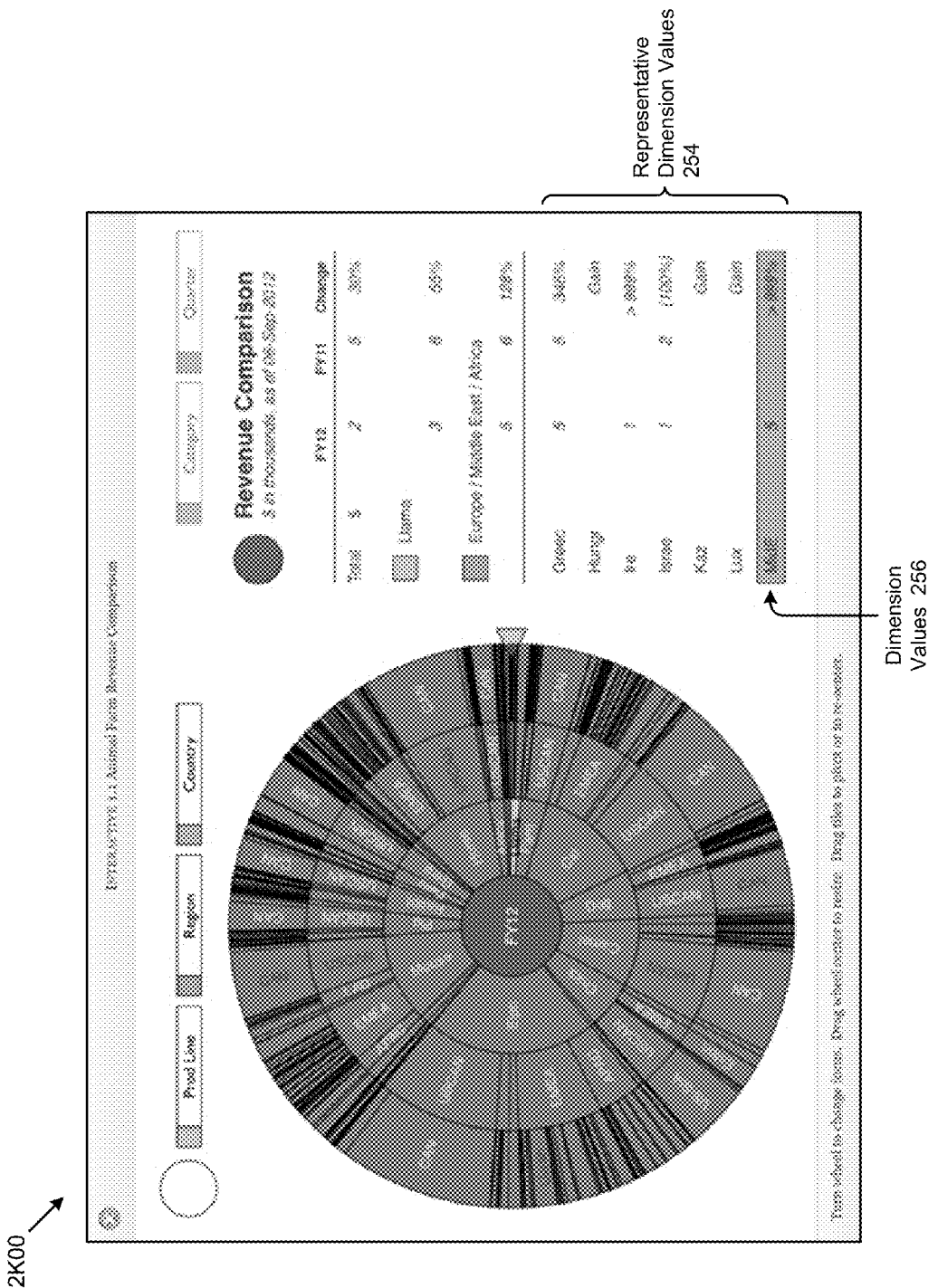
FIG. 2K depicts sample dimension value representations as shown in a tabular interface element as used for configuring and displaying multidimensional data using tandem interactive screen interfaces, according to some embodiments.

FIG. 2K depicts sample dimension value representations 2K00 as shown in a tabular interface element as used for configuring and displaying multidimensional data using tandem interactive screen interfaces. As an option, one or more instances of dimension value representations 2K00 or any aspect thereof may be implemented in the context of the architecture and functionality of the embodiments described herein. Also, the dimension value representations 2K00 or any aspect thereof may be implemented in any desired environment.

As shown in FIG. 2K, the dimension value for FY12 revenue in "MidE" needs a wedge that is too small to carry a text label on the wedge. However, the dimension values (e.g., for FY12 and FY11) for "MidE" are given in the tandem table. Specifically, as shown, a series of dimension values 256 that correspond to the selected wedge are given in the tandem table. Additionally, a selection of representative dimension values 254 are given in the tabular interface element. For example, the tabular interface element might display subcategories of the category selected one ring inward in the selected slice. In this example, EMEA is the selected category of the second ring (e.g., "Region" as shown), so in addition to the dimension values for "MidE", other countries within that region are shown as well. The tandem table shows values for higher level dimensions selected in the current slice (e.g. for "Product Line" being "Llama" and for "Region" being "EMEA")

Figure 3:
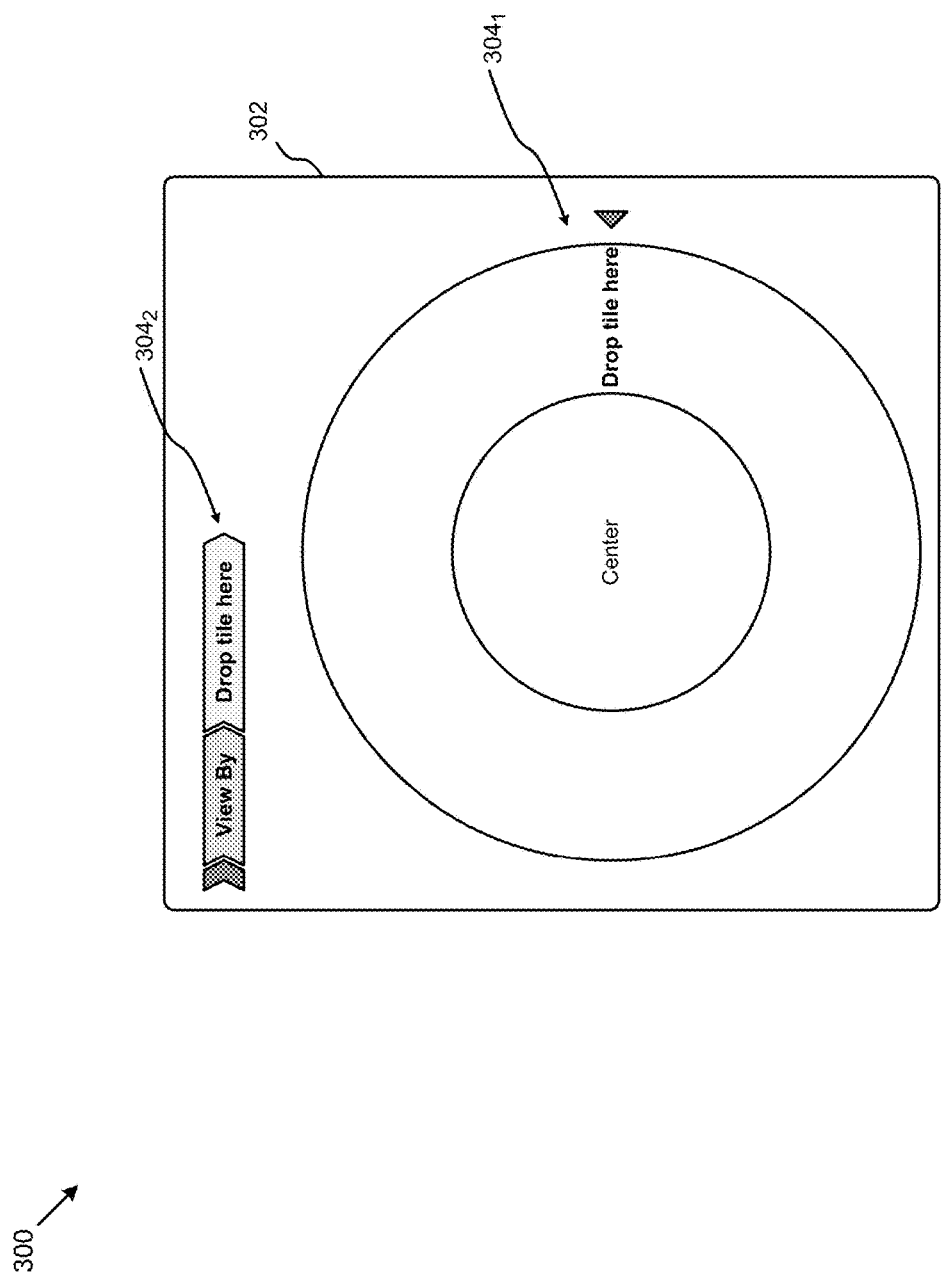
FIG. 3 is a simplified sunburst wheel schematic 300 including dimension drop zones, according to some embodiments.

FIG. 3 is a simplified sunburst wheel schematic 300 including dimension drop zones. As an option, one or more instances of sunburst wheel schematic 300 or any aspect thereof may be implemented in the context of the architecture and functionality of the embodiments described herein. Also, the dimension drop zones or any aspect thereof may be implemented in any desired environment.

As shown in FIG. 3, drop zones can be made active over a portion of a wheel (e.g., see drop zone $304_1$), or can be made active over a dimension tile (e.g., see drop zone $304_2$). Any dimension tile from any location in a tandem group 302 can be dragged, and dropped onto a drop zone target. The dimension of the dragged tile becomes the dimension of the ring or tile comprising the drop zone target.

FIG. 4A depicts a dimension tile filtering widget 4A00 to implement filtering in systems supporting configuring and displaying multidimensional data using tandem interactive screen interfaces. As an option, one or more instances of dimension tile filtering widget 402 or any aspect thereof may be implemented in the context of the architecture and functionality of the embodiments described herein. Also, the dimension tile filtering widget 402 or any aspect thereof may be implemented in any desired environment.

Filters such as the dimension tile filtering widget 402 may be implemented in any interface. In some embodiments, each dimension tile contains controls for filtering visualization (e.g., as illustrated in FIG. 4A). The filter controls enable the user to choose which information is included into analysis or is excluded from it.

The filter panel can be expanded/collapsed under the downward arrow 403 of the tile. In some embodiments (e.g., for mobile devices), the arrow is always visible. In other embodiments, (e.g., for desktop computers), arrows can be configured to become visible only while a cursor is hovering over. Clicking/tapping on an arrow expands the panel. The panel stays expanded while the user selects and deselects items inside of it. The panel collapses when the user taps outside of it. The sunburst wheel stays unchanged while the user selects and deselects items inside of the filter panel. After the user taps outside of the panel and thus collapses the panel, the sunburst wheel redraws to reflect the selection.

In exemplary cases, the filter panel lists all items (e.g., "members") belonging to the dimension. There is a selection control (e.g., checkbox) for each item. Selecting an item means to include it in the analysis. Deselecting an item means to exclude it.

The filter panel can be in various different states in some embodiments, and such states can include:
 a state where all items are selected;
 a state where multiple items are selected;
 a state where a single item is selected; and
 a state where all items are de-selected.

The state of the filters affects how the dimension tiles are shown. A default state (e.g., a state where all items are selected) can be defined to be a default state in some embodiments.

FIG. 4B depicts a selected dimension value filtering state 4B00 as implemented for configuring and displaying multidimensional data using tandem interactive screen interfaces. As an option, one or more instances of selected dimension value filtering state 4B00 or any aspect thereof may be implemented in the context of the architecture and functionality of the embodiments described herein. Also, the selected dimension value filtering state 4B00 or any aspect thereof may be implemented in any desired environment.

As shown in FIG. 4B, the selected dimension value filtering tile comprises a state where multiple, but not all, items are selected (see area 404).

Figure 4C:
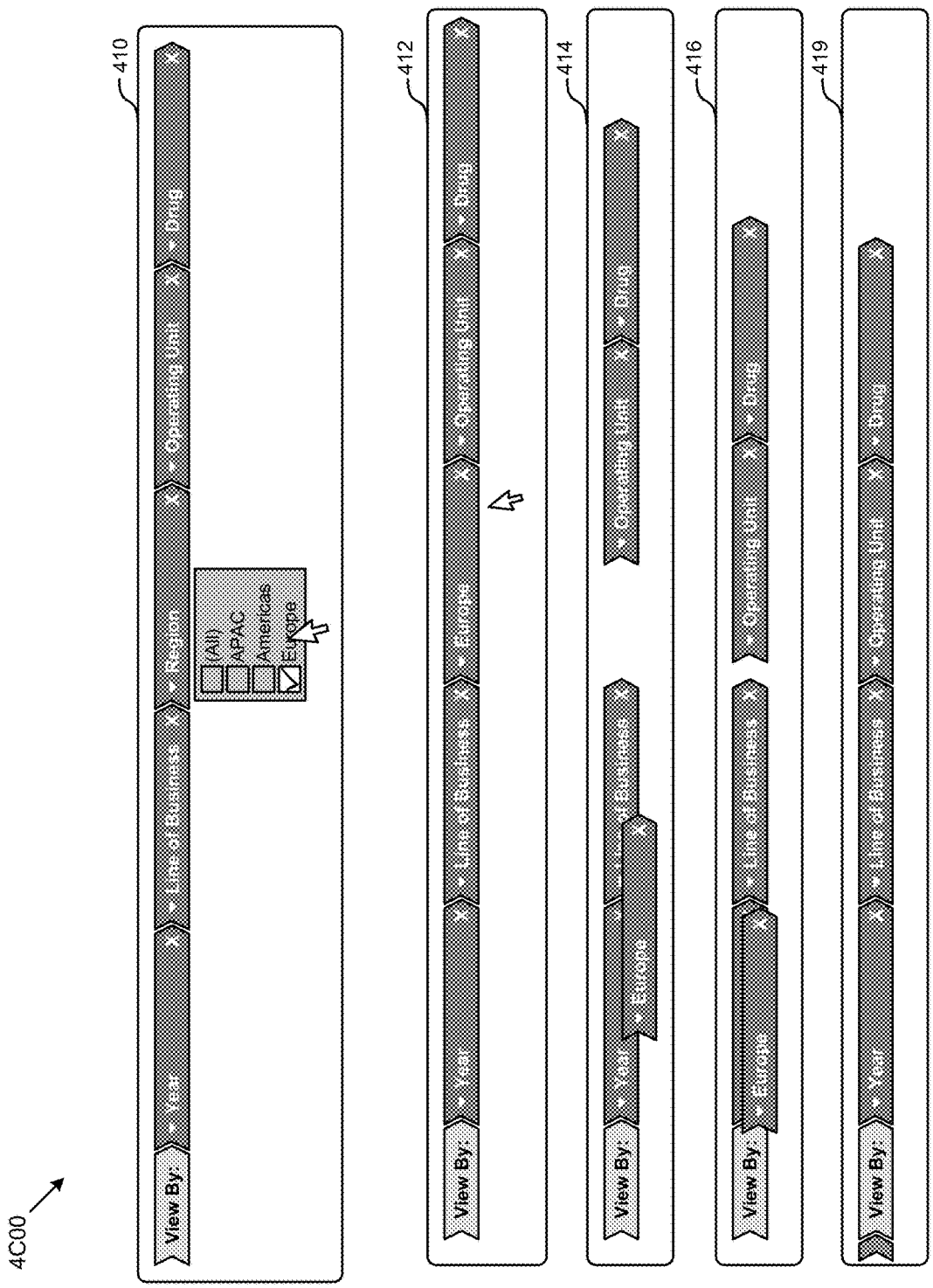
FIG. 4C depicts a multiple dimension subset filtering state as implemented for configuring and displaying multidimensional data using tandem interactive screen interfaces, according to some embodiments.

FIG. 4C depicts a multidimensional subset filtering state 4C00 as implemented for configuring and displaying multidimensional data using tandem interactive screen interfaces. As an option, one or more instances of a multiple dimension subset filtering state 4C00 or any aspect thereof may be implemented in the context of the architecture and functionality of the embodiments described herein. Also, the multiple dimension subset filtering state 4C00 or any aspect thereof may be implemented in any desired environment.

As shown in FIG. 4C, the multiple value subset filtering tiles comprise dimensions "Year", "Line of Business", "Region", "Operating Unit" and "Drug". The dimension "Region" is shown as ready to be filtered based on the selected value "Europe".

The progression depicts a technique where a single value subset filtering tile can become the new core of a sunburst wheel. The dimension tile is moved to the left of the dimension shelf while the center ring is removed from the sunburst wheel. The following steps may be involved:

Step 1: User deselects all items but one (see rendering 410).
Step 2: User taps outside of the panel to close it (see rendering 412).
Step 3: Dimension tile label changes to that of a selected item. The tile starts to move to the left of the "View By" indicator (see rendering 414 and rendering 416).
Step 4: The tile becomes a strip at the left of the "View By" indicator (see rendering 419)

Figure 4D:
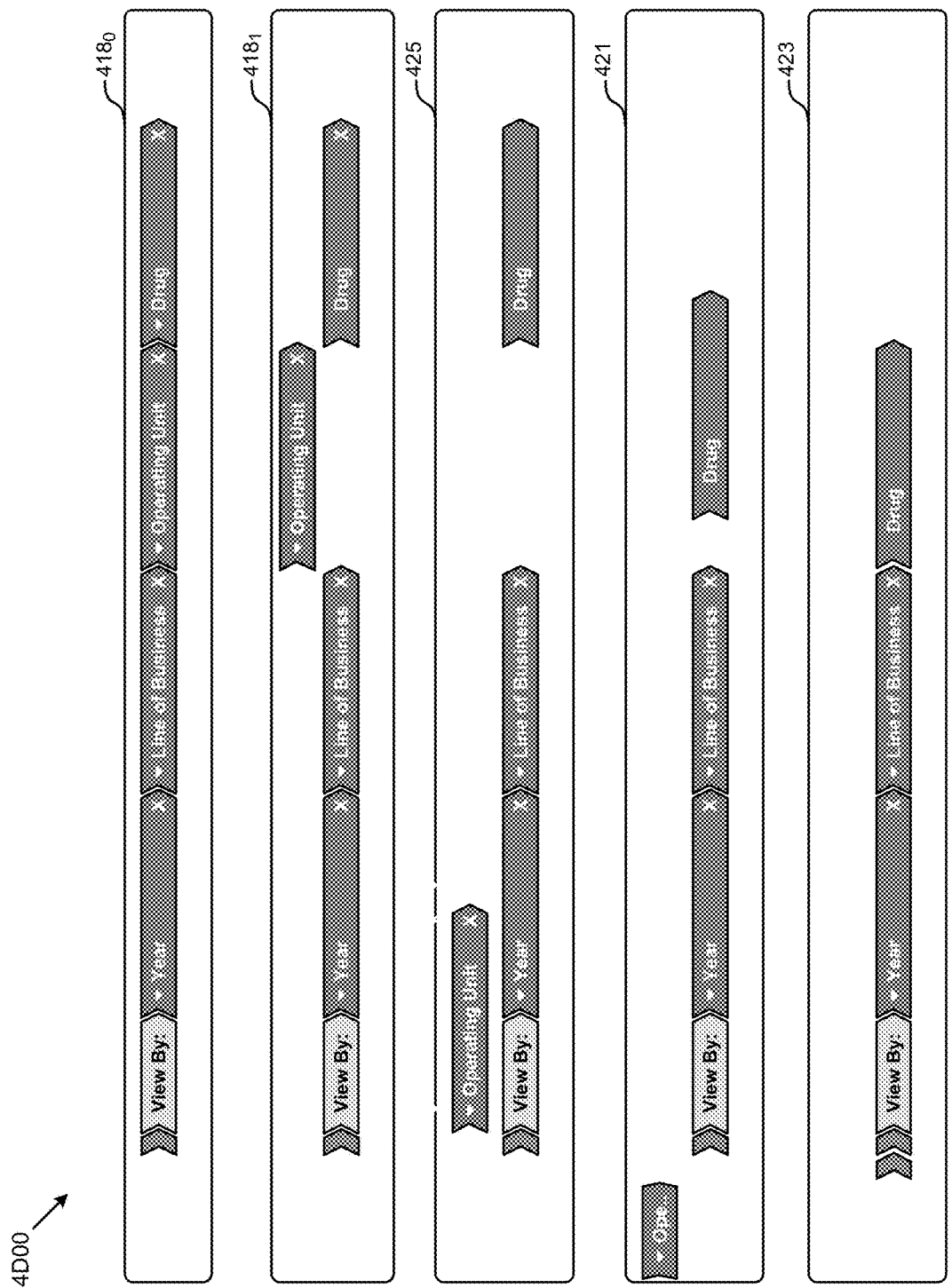
FIG. 4D depicts a dimension collapsing technique implemented using dimension tiles in systems supporting configuring and displaying multidimensional data using tandem interactive screen interfaces, according to some embodiments.

FIG. 4D depicts a dimension collapsing technique 4D00 implemented using dimension tiles in systems supporting configuring and displaying multidimensional data using tandem interactive screen interfaces. The dimension collapsing technique 4D00 or any aspect thereof may be implemented in any desired environment.

As shown in FIG. 4D, the dimension collapsing technique comprises several steps.

Step 1: The user considers the tile to collapse (see depiction $418_0$ and depiction $418_1$) and moves the tile to the left (see depiction 425).
Step 2: As the tile moves it "shrinks" to a strip and the tiles that were at its right move to the left to close the gap (see depiction 421).
Step 3: The tile becomes a strip at the core (see depiction 423).

There is space at the end of the Dimension Shelf to append another tile.

Figure 4E:
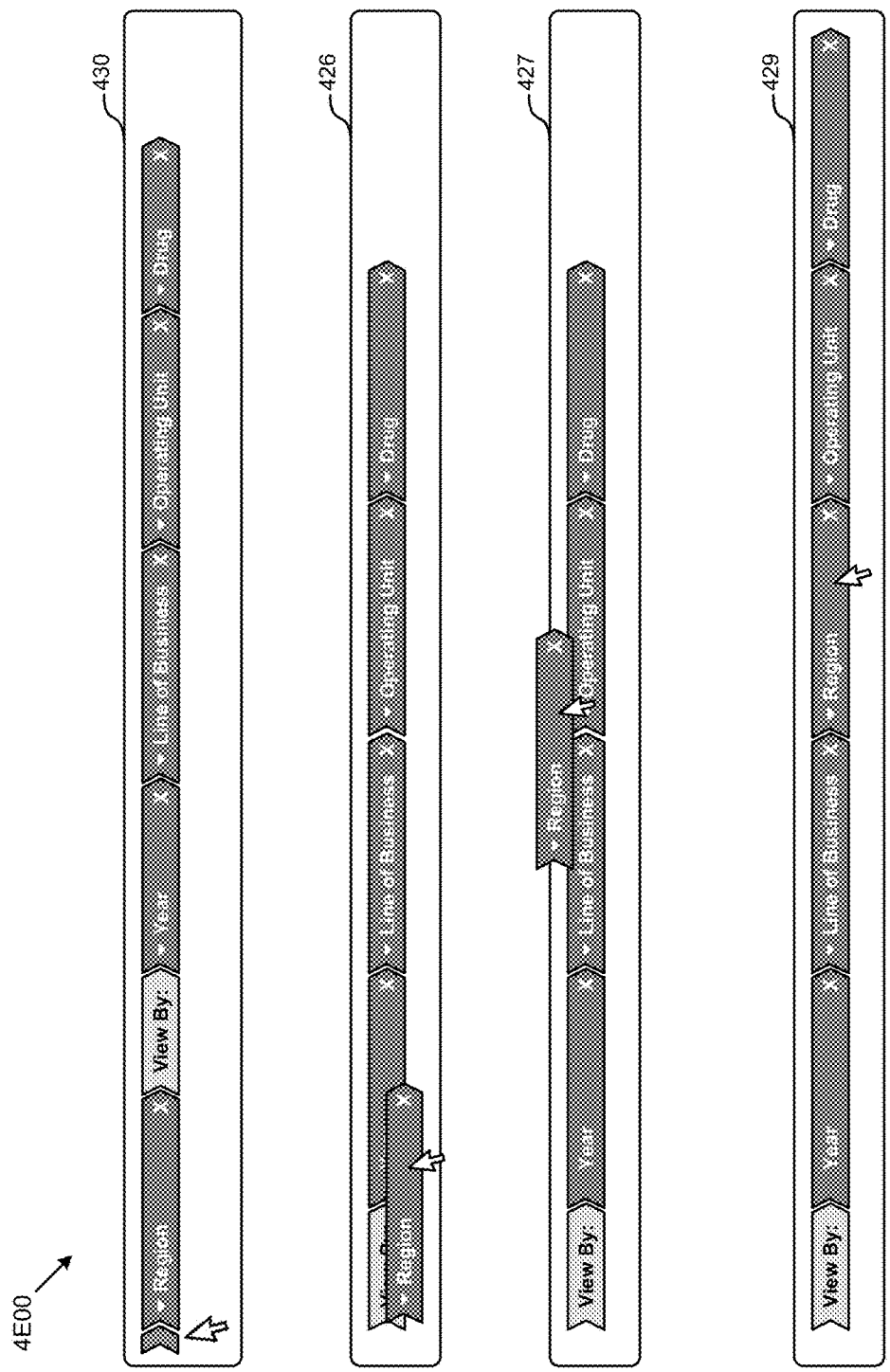
FIG. 4E depicts a dimension expanding technique implemented using dimension tiles in systems supporting configuring and displaying multidimensional data using tandem interactive screen interfaces, according to some embodiments.

FIG. 4E depicts a dimension expanding technique 4E00 implemented using dimension tiles in systems supporting configuring and displaying multidimensional data using tandem interactive screen interfaces. Also, the dimension expanding technique 4E00 or any aspect thereof may be implemented in any desired environment.

Strictly as an example, a strip to the left of "View By" is touched or selected, or hovered-over so as to select the dimension (see depiction 430). The dimension tile is dragged to the right of the "View By" icon (see depiction 426, and dropped into any location (see depiction 427). The dragged tile is inserted into the series of dimensions (see depiction 429). In some embodiments, a dimension tile can be brought into the dimension shelf from any location and used to expand the set of dimensions.

In exemplary situations, the dimension tile label changes to that of a selected slice of the sunburst wheel. As an alternative, a user can drag a dimension tile to the core tile area. This would make a selected slice of that dimension a core of the sunburst wheel.

Figure 4F:
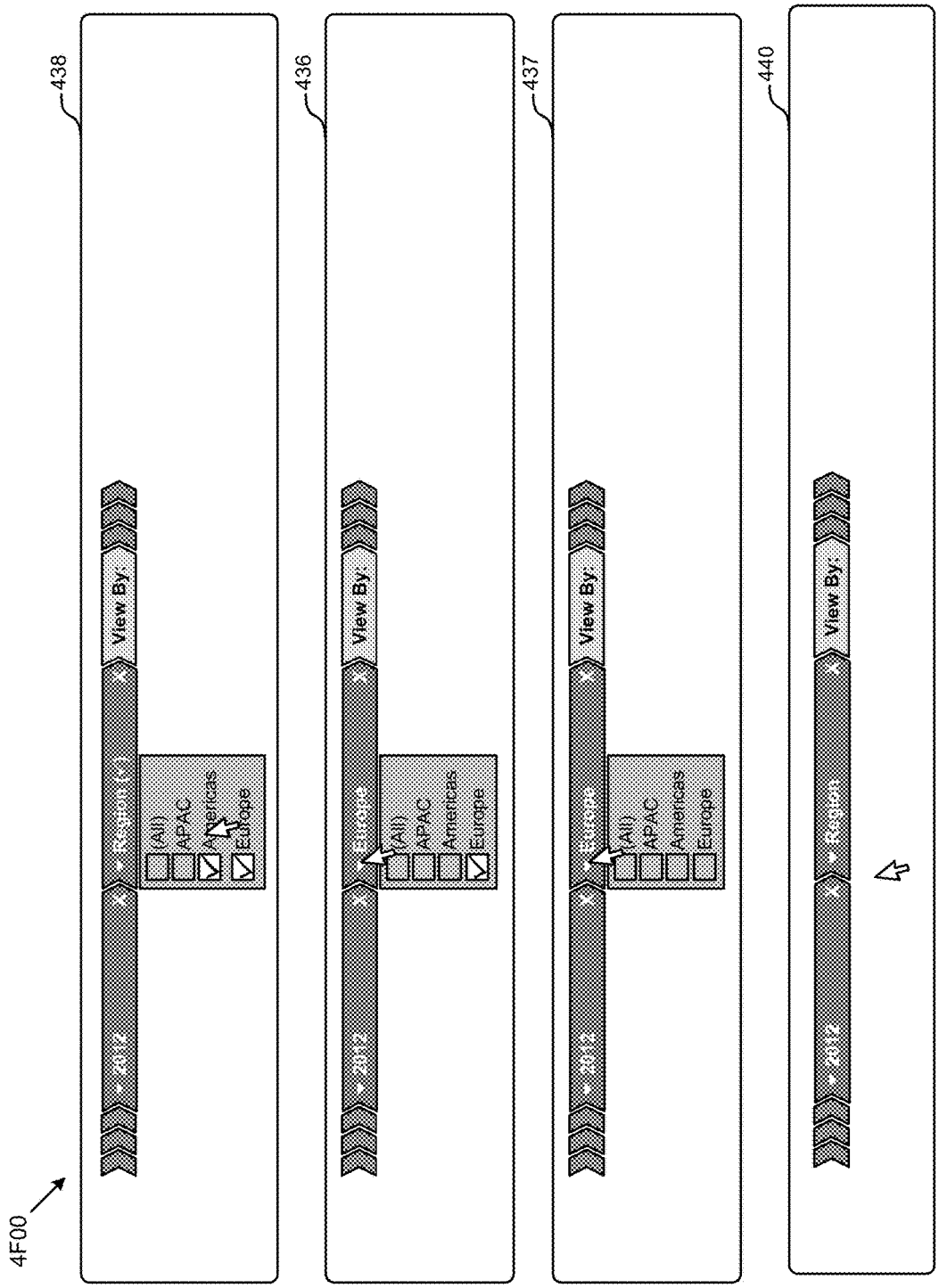
FIG. 4F depicts a dimension de-selection technique implemented using dimension tiles in systems supporting configuring and displaying multidimensional data using tandem interactive screen interfaces, according to some embodiments.

FIG. 4F depicts a dimension de-selection technique implemented using dimension tiles in systems supporting configuring and displaying multidimensional data using tandem interactive screen interfaces, according to some embodiments.

As shown, the "Region" dimension has a drop-down filter menu with checkboxes. In the depicted initial state, the values "Americas" and "Europe" are checked, and the tile label include a filter indicator (see the parenthesized check mark in depiction 438). The user can de-select a value, and if there is only one remaining filter value, then the tile label changes to the one remaining selected value (see depiction 436). When the user de-selects until there are no more selected values in the dimension (see depiction 437) then the dimension tile changes to the name of the dimension (see depiction 440).

Dimensions can be filtered down to only focus on one item, which means there could be more than one tile in the core tile area. More than one dimension can be filtered down to only focus on one item, which means there could be more than one tile in the core tile area. The users can expand the core tile area by tapping on it to see which dimensions it contains. The entire core tile area can be implemented as a touch target. Expanding the core tiles on the left collapses the dimension tiles on the right. Tapping on the dimension tiles on the right collapses core tiles on the left.

In some embodiments, the order of the core tiles is configured to be from older to newer left to right, with the core tile being the first one on the left. Some embodiments are implemented without this ordering.

Figure 4G:
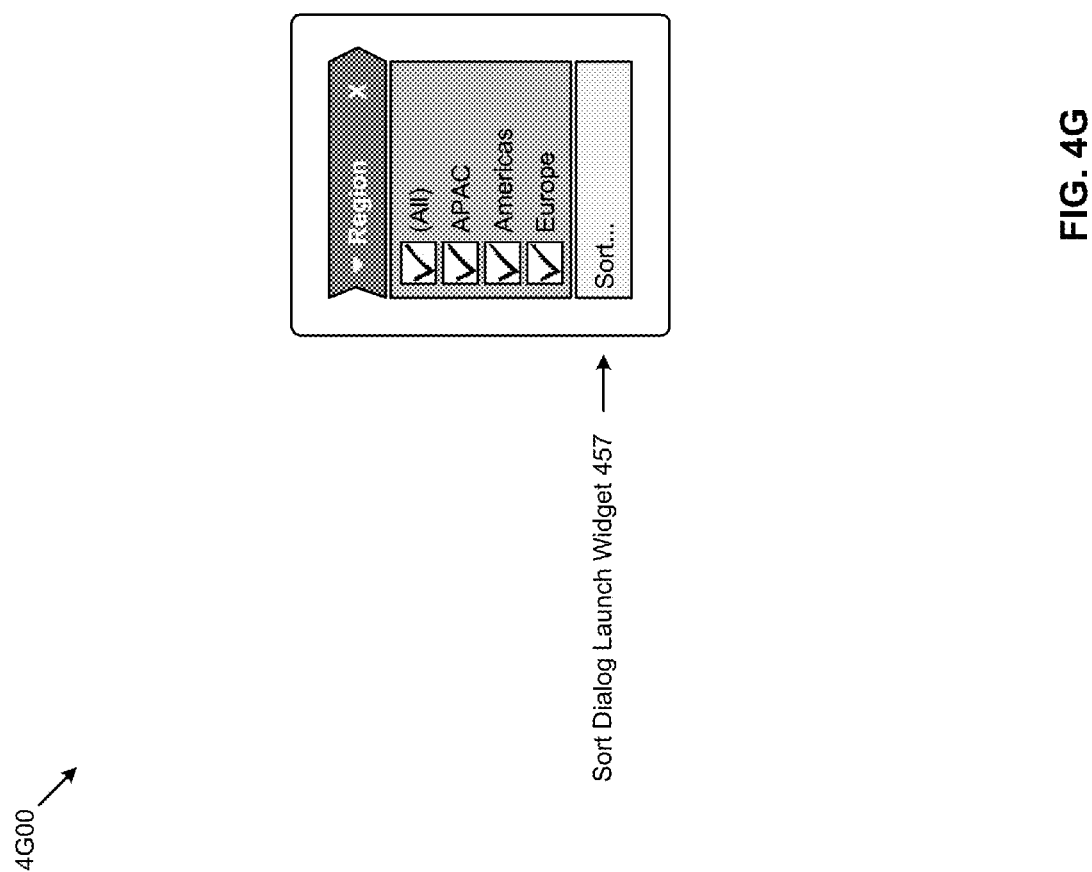
FIG. 4G depicts a sort-by-value technique implemented using dimension tiles in systems supporting configuring and displaying multidimensional data using tandem interactive screen interfaces, according to some embodiments.

FIG. 4G depicts a sort-by-value technique 4G00 implemented using dimension tiles in systems supporting configuring and displaying multidimensional data using tandem interactive screen interfaces. Also, the sort by value technique 4G00 or any aspect thereof may be implemented in any desired environment.

As shown in FIG. 4G, the sort by value technique comprises sorting using a sort dialog launch widget 457. Sorting enables a user to independently sort the wedge ordering shown on each ring. In some embodiments, the sorting order is predefined. The sorting order can be controlled by any suitable measure. If one sorts on the same measure that is used to control wedge thickness (primary measure), the effect will be to show the biggest wedges at the start of each arc controlled by a given parent wedge, and concentrate all the smaller wedges together at the other end of the arc. This can make the sunburst dramatically cleaner and easier to scan. It also helps users quickly focus on the wedges that matter to them.

If one sorts on the measure used to control the heat map (secondary measure), the colors throughout a dimension ring will form a spectrum of colors, making the sunburst less busy and making it easier to find and focus on the greenest or reddest wedges, for example.

The interface can be configured to preserve the ability to sort alphabetically or in another order. Users may prefer, for example, that time dimensions like quarters or months always be arranged in chronological order.

Figure 5A:
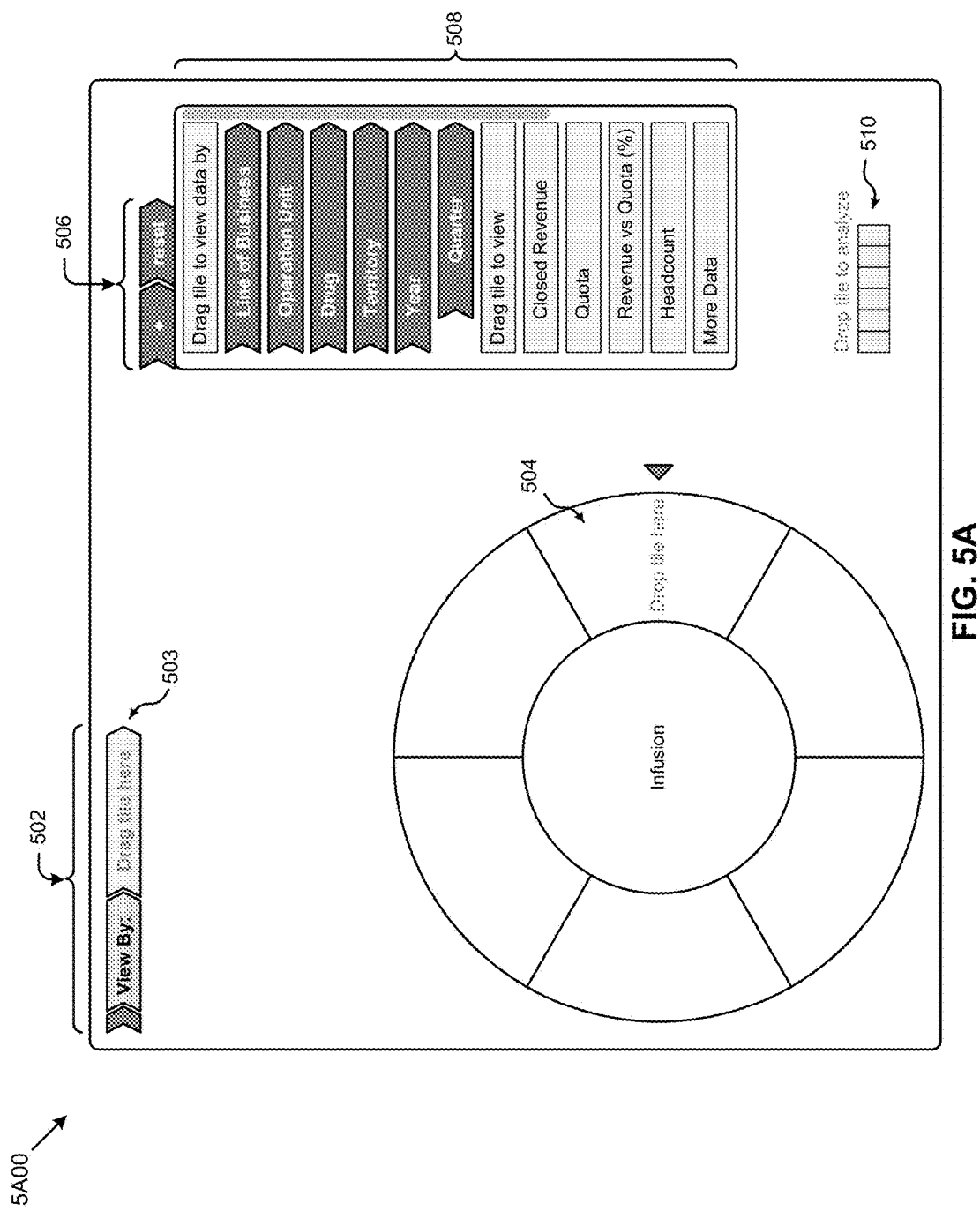
FIG. 5A is a schematic representation of a dimension tile shelf used for configuring and displaying multidimensional data using tandem interactive screen interfaces, according to some embodiments.

FIG. 5A is a schematic 5A00 representation of a dimension tile shelf used for configuring and displaying multidimensional data using tandem interactive screen interfaces. The schematic 5A00 or any aspect thereof may be implemented in any desired environment.

As shown in FIG. 5A, the schematic depicts an initial dimension shelf 502 comprising a drop target for dimension tiles. Users can drag a dimension tile from the "+" data selector 506 and drop it on the initial dimension shelf. In some embodiments (e.g., for mobile devices), the number of dimensions that can be displayed at the same time is limited to five. Users can append, insert, or replace tiles.

Some embodiments support other drop targets. For example, and as shown, a wedge drop target 504 is provided in the wheel. Various widgets can be dragged, and dropped. In some situations, a dimension tile array 508 is presented to the user, and the user can drag and drop dimension tiles onto any drop target (e.g., onto wedge drop target 504 or onto dimension shelf drop target 503, or drop target 510). Moreover, items from a ring of a sunburst wheel can dropped onto a drop target.

Figure 5B:
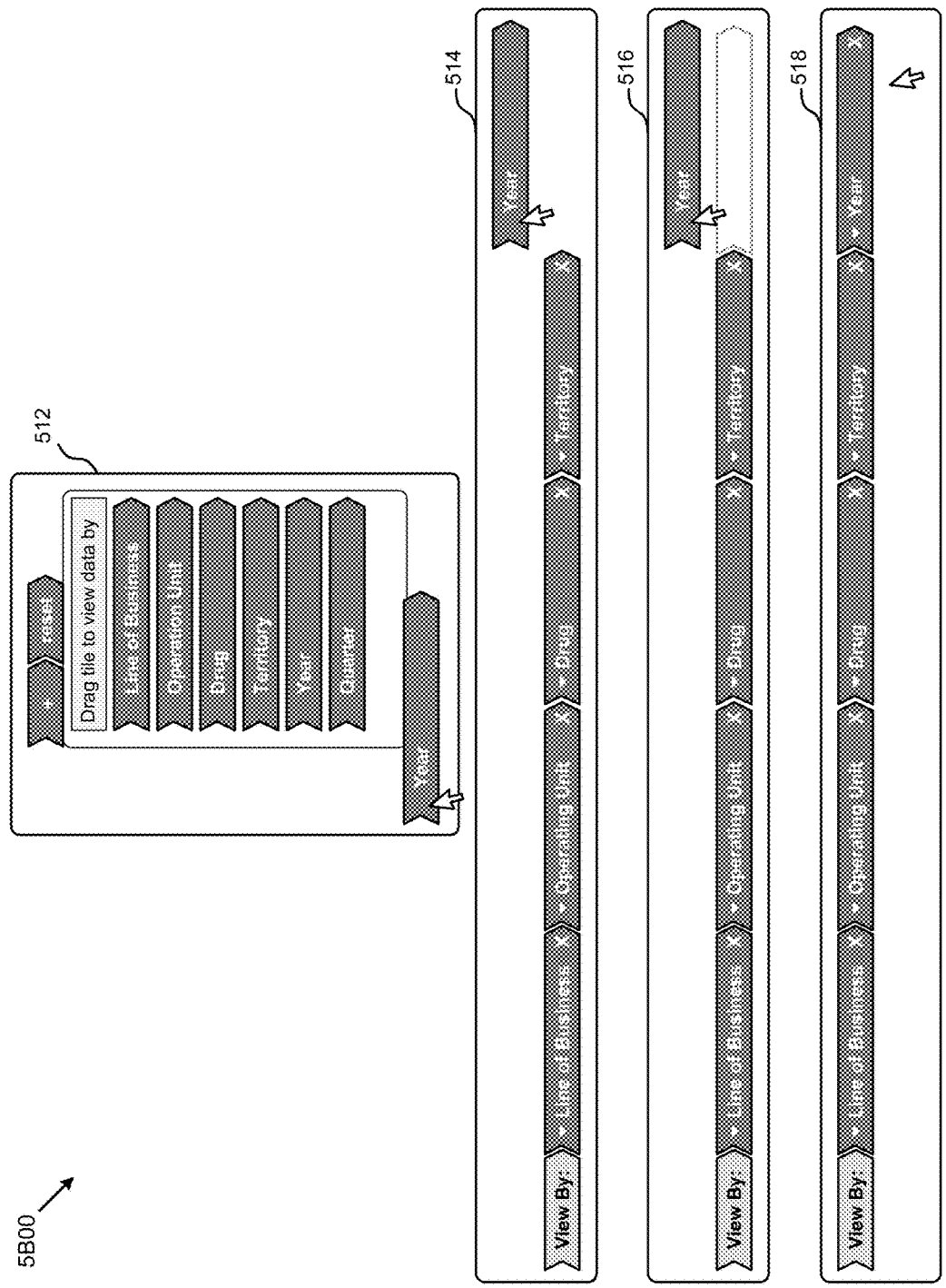
FIG. 5B depicts a dimension appending operation implemented using dimension tiles in systems for configuring and displaying multidimensional data using tandem interactive screen interfaces, according to some embodiments.

FIG. 5B depicts a dimension appending operation 5B00 implemented using dimension tiles in systems for configuring and displaying multidimensional data using tandem interactive screen interfaces. As an option, one or more instances of dimension appending operation 5B00 or any aspect thereof may be implemented in the context of the architecture and functionality of the embodiments described herein. Also, the dimension appending operation 5B00 or any aspect thereof may be implemented in any desired environment.

As shown in FIG. 5B, the dimension appending operation comprises tile ordering and time dropping. If the tile is dropped at the right end of the shelf, it becomes an outermost dimension. Users are restricted from dropping a tile at the end of the shelf if the shelf is full (e.g., if it already contains a full set of tiles). The following is a list of steps for this functionality in some embodiment. Strictly as an example, this embodiment includes use of grip targets. A grip target is an area of the screen that accepts a drag input. In some cases each dimension tile is a separate grip target. Touching or holding down on the mouse from within the tile and then dragging while keeping finger on screen or mouse button depressed will cause the entire tile to visibly leave its initial position and follow the traversal. Attempting to initiate a drag outside the tile would be ignored because the surrounding area is not a grip target

- Step 1. User selects a tile inside of the selection box 512.
- Step 2. User drags the tile from the selection box. (Note: Within the selection box, anywhere inside of the tile is a grip target. As soon as a pointer moves outside of the selection box, the pointer jumps to the left of the tile.)
- Step 3. User drags the tile toward a dimension shelf (see depiction 514).
- Step 4. The area at the end of the dimension shelf is highlighted as a drop target (see depiction 516).
- Step 5. User lets go of the tile. The shelf is redrawn to show the new tile at the end of the shelf (see depiction 518). The new tile now displays an "X" (e.g., to close) and the new tile presents filter controls.

If user drags the tile away from the drop target and releases the tile, the dimension shelf goes back to its previous state (e.g., initial dimension shelf 502 of FIG. 5A).

Figure 5C:
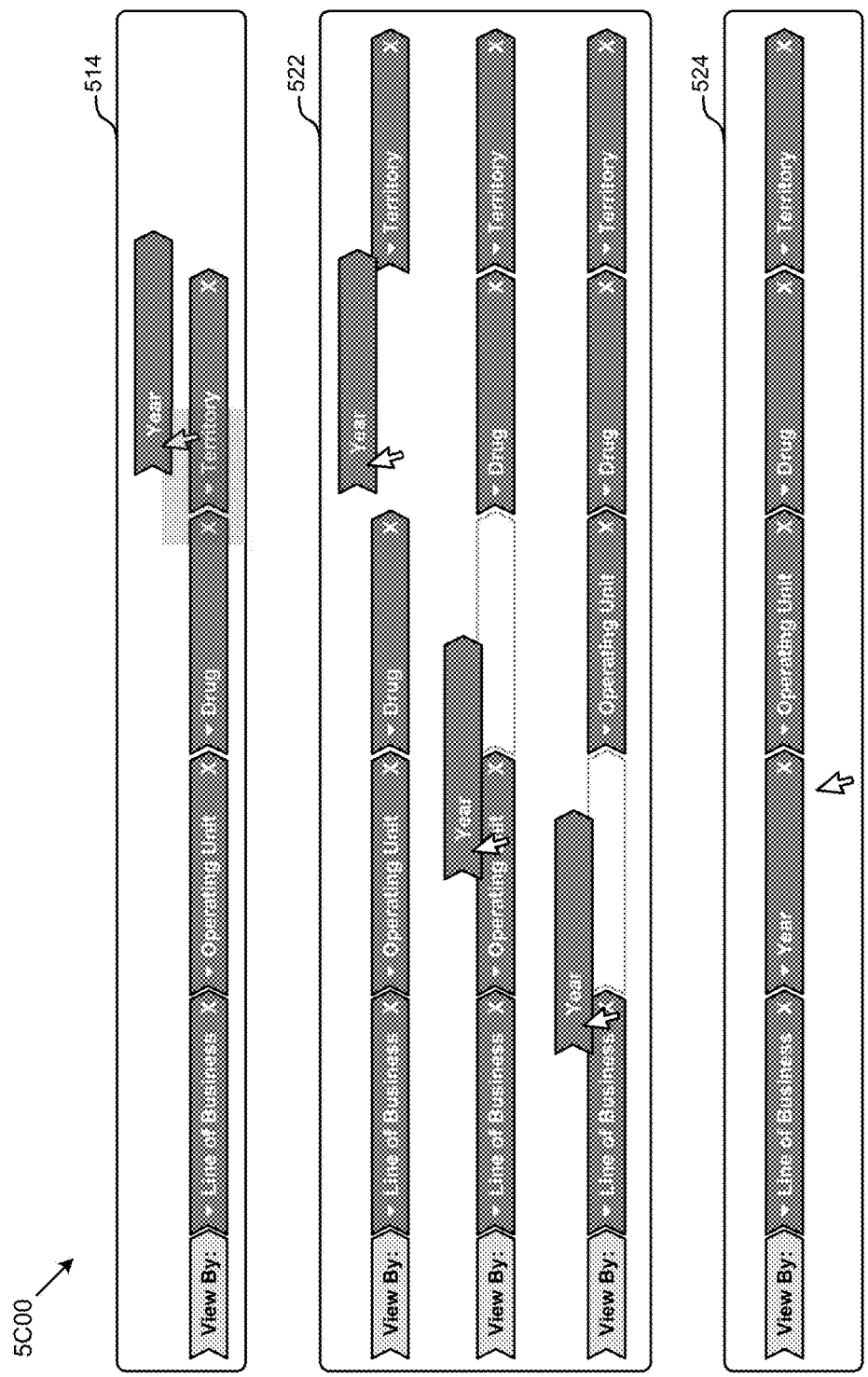
FIG. 5C depicts a dimension insertion operation implemented using dimension tiles in systems for configuring and displaying multidimensional data using tandem interactive screen interfaces, according to some embodiments.

FIG. 5C depicts a dimension insertion operation 5C00 implemented using dimension tiles in systems for configuring and displaying multidimensional data using tandem interactive screen interfaces. As an option, one or more instances of dimension insertion operation 5C00 or any aspect thereof may be implemented in the context of the architecture and functionality of the embodiments described herein. Also, the dimension insertion operation 5C00 or any aspect thereof may be implemented in any desired environment.

As shown in FIG. 5C, the dimension insertion operation comprises several steps. Strictly as an example, if a tile is dropped in between other dimension tiles, it gets inserted in between. The following is a list of steps for this functionality in some embodiments:

- Step 1. User drags a tile in between of two tiles (see depiction 514).
- Step 2. The tile at the right of the pointer moves to the right to create space (see depiction 522). The area in between the two tiles is highlighted as a drop target.
- Step 3. User lets go of the tile. The shelf is redrawn to show the new tile in between (see depiction 524).

If the shelf is already full (e.g., contains a full set of tiles), the outermost tile gets dropped from the visualization.

Figure 5D:
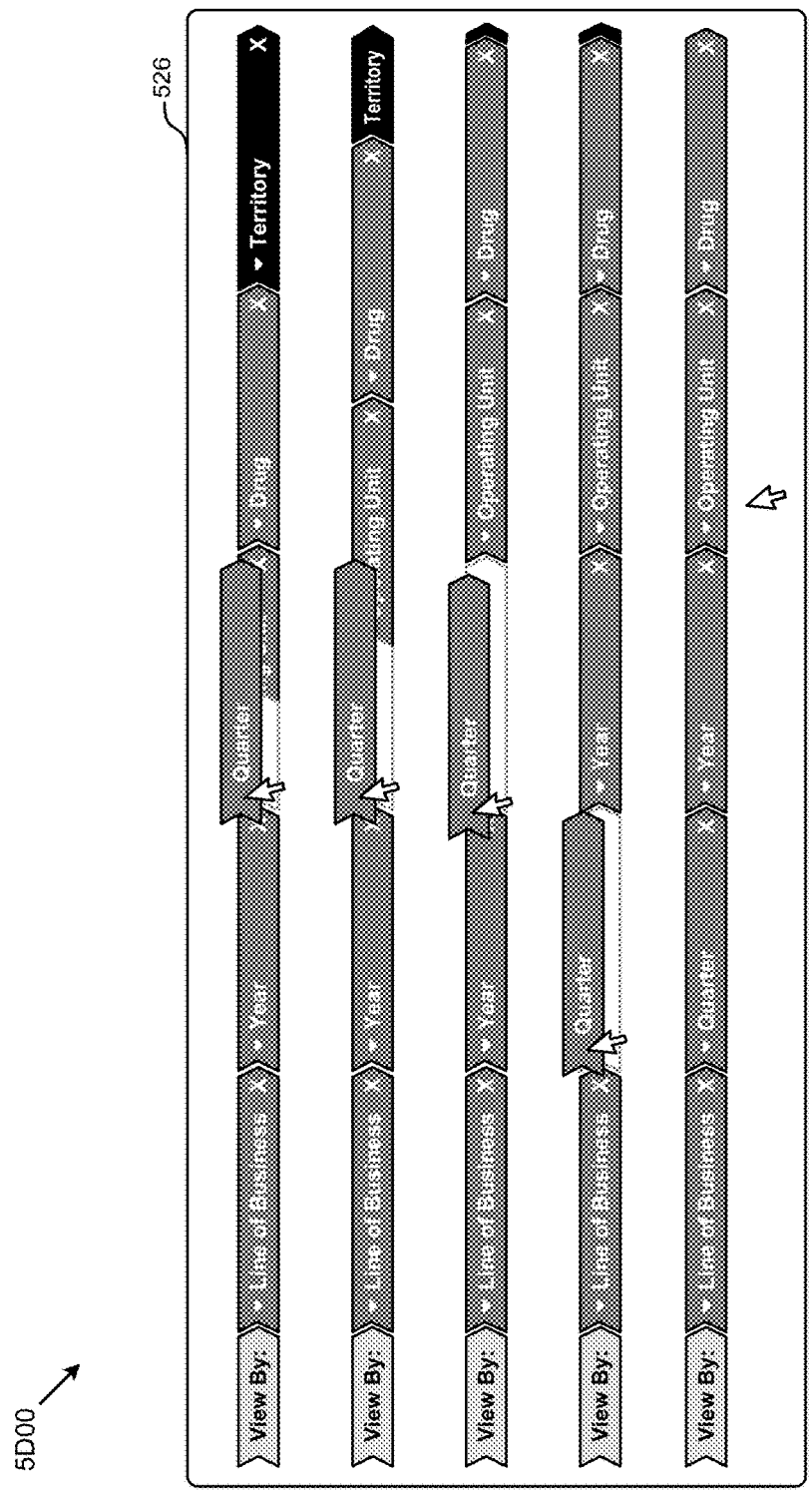
FIG. 5D depicts dimension shelf-shrinking behavior implemented using dimension tiles in systems for configuring and displaying multidimensional data using tandem interactive screen interfaces, according to some embodiments.

FIG. 5D depicts dimension shelf-shrinking behavior 5D00 implemented using dimension tiles in systems for configuring and displaying multidimensional data using tandem interactive screen interfaces. As an option, one or more instances of dimension shelf shrinking behavior 5D00 or any aspect thereof may be implemented in the context of the architecture and functionality of the embodiments described herein. Also, the dimension shelf shrinking behavior 5D00 or any aspect thereof may be implemented in any desired environment.

As shown in FIG. 5D, the dimension shelf shrinking behavior comprises shrinking such that the outermost tile "shrinks" to accommodate a new tile. A new tile can be brought into view 526 from any location on any other user interface widget. The strip remains visible during the accommodation operation, and remains visible and in a reconfigured state when the user lets go of the new tile. If user drags the tile away from the drop target and lets go of the tile, the dimension shelf goes back to a previous state (e.g., the outermost tile gets reinstated).

Figure 5E:
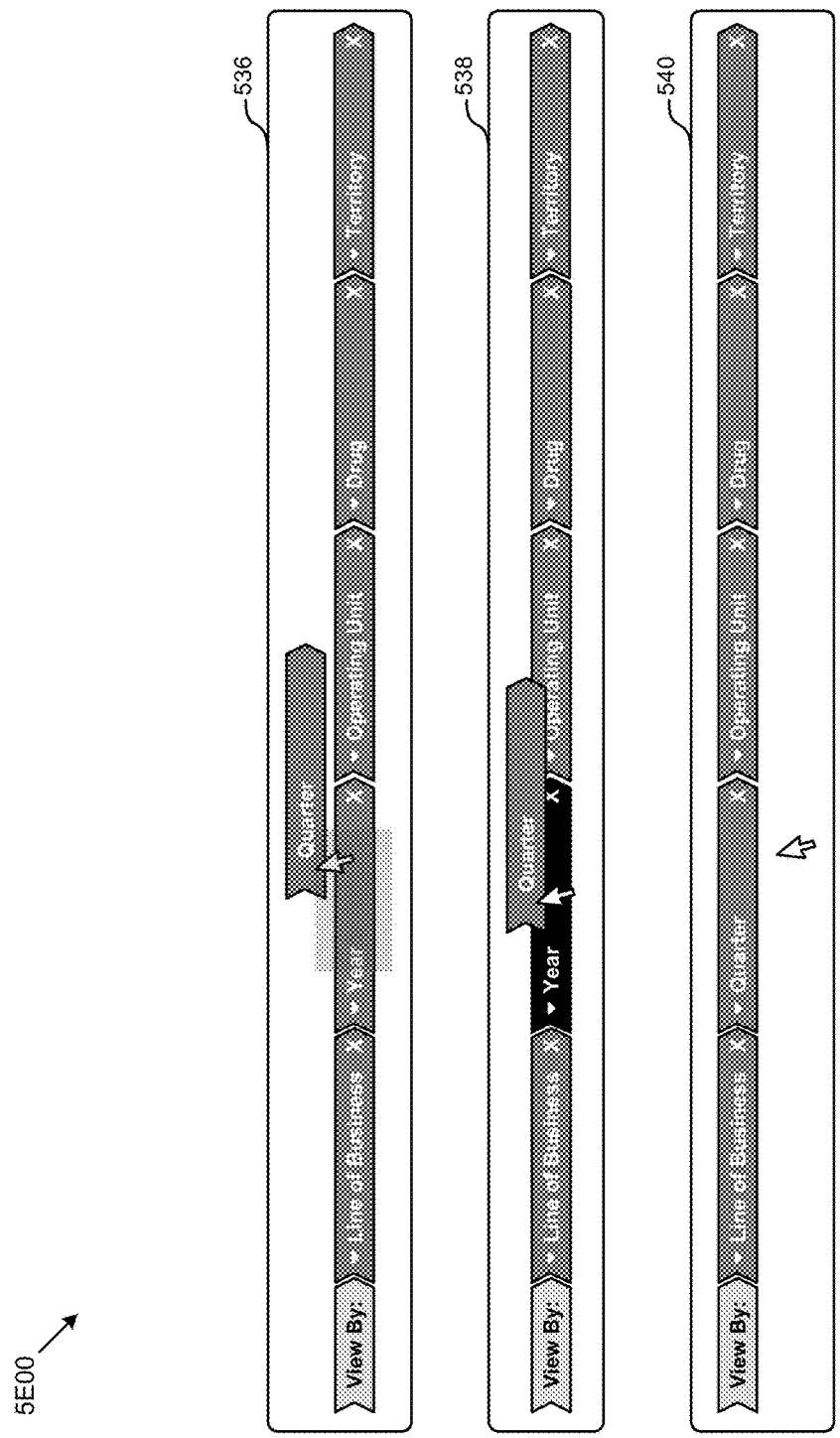
FIG. 5E depicts dimension replacement behavior implemented using dimension tiles in systems for configuring and displaying multidimensional data using tandem interactive screen interfaces, according to some embodiments.

FIG. 5E depicts dimension replacement behavior 5E00 implemented using dimension tiles in systems for configuring and displaying multidimensional data using tandem interactive screen interfaces. As an option, one or more instances of dimension replacement behavior 5E00 or any aspect thereof may be implemented in the context of the architecture and functionality of the embodiments described herein. Also, the dimension replacement behavior 5E00 or any aspect thereof may be implemented in any desired environment.

As shown in FIG. 5E, when a new tile is dropped on top of another tile, the latter gets replaced by the new tile.

The dimension replacement operation is effected as follows:

- Step 1: User drags a new tile over another tile (see depiction 536).
- Step 2: The tile underneath is highlighted as a drop target (see depiction 538).
- Step 3: User lets go of the new tile (see depiction 540).
- Step 4: The shelf is redrawn to show the new tile in place of the old one.

In some embodiments, if a user drags the tile away from the drop target and releases the tile, the dimension shelf is redisplayed in a previous state. The order of dimension tiles in the dimension shelf controls the order or presentation of dimensions in any other tandem display devices. For example, users can drag and drop tiles within the shelf to reorder the dimension rings in the sunburst wheel.

Figure 5F:
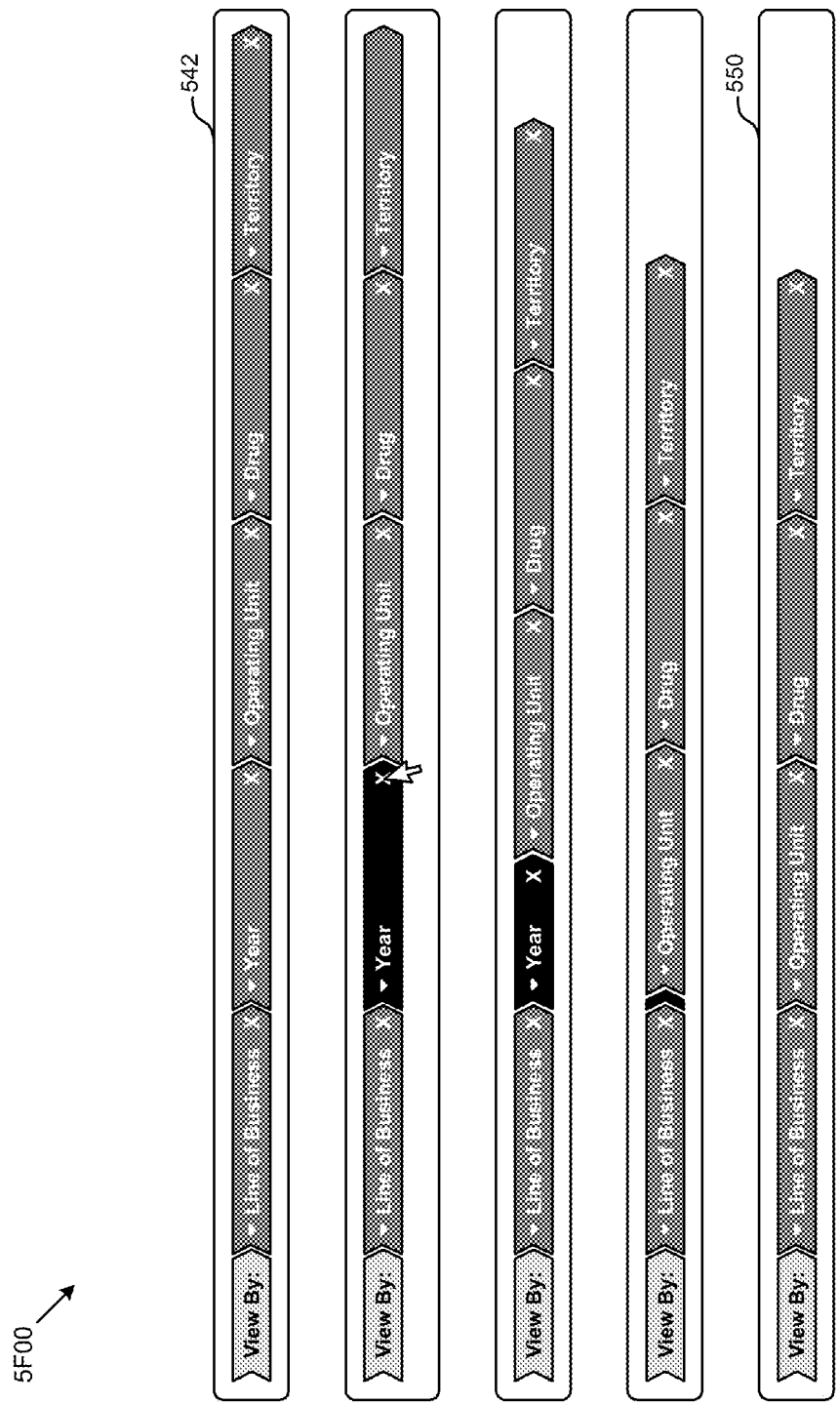
FIG. 5F depicts a dimension removal operation implemented using dimension tiles in systems for configuring and displaying multidimensional data using tandem interactive screen interfaces, according to some embodiments.

FIG. 5F depicts a dimension removal operation 5F00 implemented using dimension tiles in systems for configuring and displaying multidimensional data using tandem interactive screen interfaces. As an option, one or more instances of dimension removal operation 5F00 or any aspect thereof may be implemented in the context of the architecture and functionality of the embodiments described herein. Also, the dimension removal operation 5F00 or any aspect thereof may be implemented in any desired environment.

As shown in FIG. 5F, the dimension removal operation comprises user selection of a removal device (e.g., the "X" within a particular tile). User selection of the removal device causes the tile to be removed to shrink in an animation, and the shrinking continues until the tile is absent from the dimension shelf (see depiction 542 through depiction 550).

FIG. 5G depicts sample usage of a data selector operator 5G00 implemented using dimension tiles in systems for configuring and displaying multidimensional data using tandem interactive screen interfaces. As an option, one or more instances of data selector operator 5G00 or any aspect thereof may be implemented in the context of the architecture and functionality of the embodiments described herein. Also, the data selector operator 5G00 or any aspect thereof may be implemented in any desired environment.

As shown in FIG. 5G, the data selector operator comprises a data selector 110. In this embodiment, the data selector 110 includes a "+" control and a reset control. The data selector enables users to select which dimensions and metrics to visualize and analyze data by. Tapping the "+" control opens up a floating pane. The pane contains several sections:

A section for dimensions named "View By".

A section for metrics named "View", and a "More Data" control. In some cases, the "More Data" control serves to expand into additional dimensions, and/or calculated measures.

A user can drag a dimension tile from the "View By" section and drop it to the dimension shelf. Users can also drag a metric tile from the "View" section and drop it on top of the graph title as a primary metric, or on top of the legend as secondary metric. Users select "More Data" for additional functionality, such for displaying calculated fields or other measures. The existence and/or values of measures can be applied either to determine how big the wedges are or how they are colored. In some renderings, the wedge size is a primary indicator in the sense that it has the biggest visual impact to understand the meaning of the data shown in the visualization. Some implementations use wedge size as a primary metric and use color as a secondary metric.

Other touch and tandem operations are possible to use singly, or in combination or in a sequence. Strictly as examples, users can use touch operations as follows:

Using a touch/rotate operation to select a specific wedge/slice (e.g., by spinning the sunburst wheel until the slice is in front of the selector).

By spinning left.

By spinning right.

By gripping targets for dragging, and direction of movement for spinning

By tapping. Users can tap on a slice to auto-rotate into the selected position. Tapping on tiles can also be used to display the dropdown menu or delete the tile. Tapping a row of the tandem table can cause the wheel to spin so that row becomes selected.

The entire sunburst wheel can be configured as a drop target.

By increasing the overall size of the sunburst wheel by dragging it toward the left edge of the screen.

By reducing the overall size of the sunburst wheel by dragging it to the right.

By centering a sunburst via the technique of dragging a tile to the core.

By accelerating the rate of enlargement or reduction as the user maintains a continuous drag.

By gripping. Gripping can be performed for targets and direction of the movement for dragging to enlarge.

By pinching. Pinching can be performed to enlarge or shrink.

By gliding across the rows of the tandem table to advance wheel to each item in turn, thereby allowing movement in small increments.

By dragging to the bottom of lists in the tile dropdowns or tandem tables to scroll additional items into view.

Any of the aforementioned touch operations can have a respective effect on any tandem widgets. Using a touch operation to spin the sunburst wheel also causes updates to the tandem table display. Scroll operations may be performed using touch operations.

In some embodiments, a user can focus on the current slice with a single gesture, for example by tapping a row in the tandem table. In addition to the aforementioned gestures and/or use of drop-downs, a user can use tiles to establish focus. For example, a user can simply drag a tile to the left of the "View By"—doing this would be equivalent to unchecking everything in that tile's drop-down filter menu except for the currently selected wedge/slice. The tile would move to the center side and the sunburst would update accordingly.

In some embodiments, a two-fingered pinch is used to zoom in and out on the sunburst. In an alternate embodiment, pinching is reserved for opening/closing the entire widget (e.g., when that widget is used in an iBook).

Gestures can also be performed over the tandem table interface. Some embodiments provide the ability to scroll through the tandem table at a steady rate, item by item, regardless of slice size. As users drag up or down, the highlight will advance, scrolling the lower table as needed; and the sunburst wheel will jump and settle into the exact center of the corresponding slice every time a new item is highlighted in the tandem table. This way, users can turn the sunburst wheel to move it proportional to size (swiping the sunburst wheel 30 degrees turns the sunburst wheel 30 degrees, whether there is one slice or one hundred), and scroll the tandem table to move it proportional to the number of items. This gives the user a powerful way to get at very thin slices.

One feature in some embodiments is the ability to independently sort the wedge order on each ring. The sorting order can be controlled by any measure the designer specifies. If one sorts on the same measure that is used to control wedge thickness, the effect will be to show the biggest wedges at the start of each arc controlled by a given parent wedge, and concentrate all the thin edges together at the other end of the arc. This can make the sunburst dramatically cleaner and easier to scan. It also helps users quickly focus on the wedges that matter. Similarly, if one sorts on the measure used to control the heat map, the colors across each child arc will form a spectrum, making the sunburst less busy and making it easier to find and focus on the greenest or reddest wedges. When combined with a turning sunburst wheel, this makes it especially easy for users to scan through each set of children from good to bad. The sorting function provides the ability to sort alphabetically or in standard orders as well. Users may prefer, for example that time dimensions such as quarters or months be arranged in a chronological order.

Figure 6:
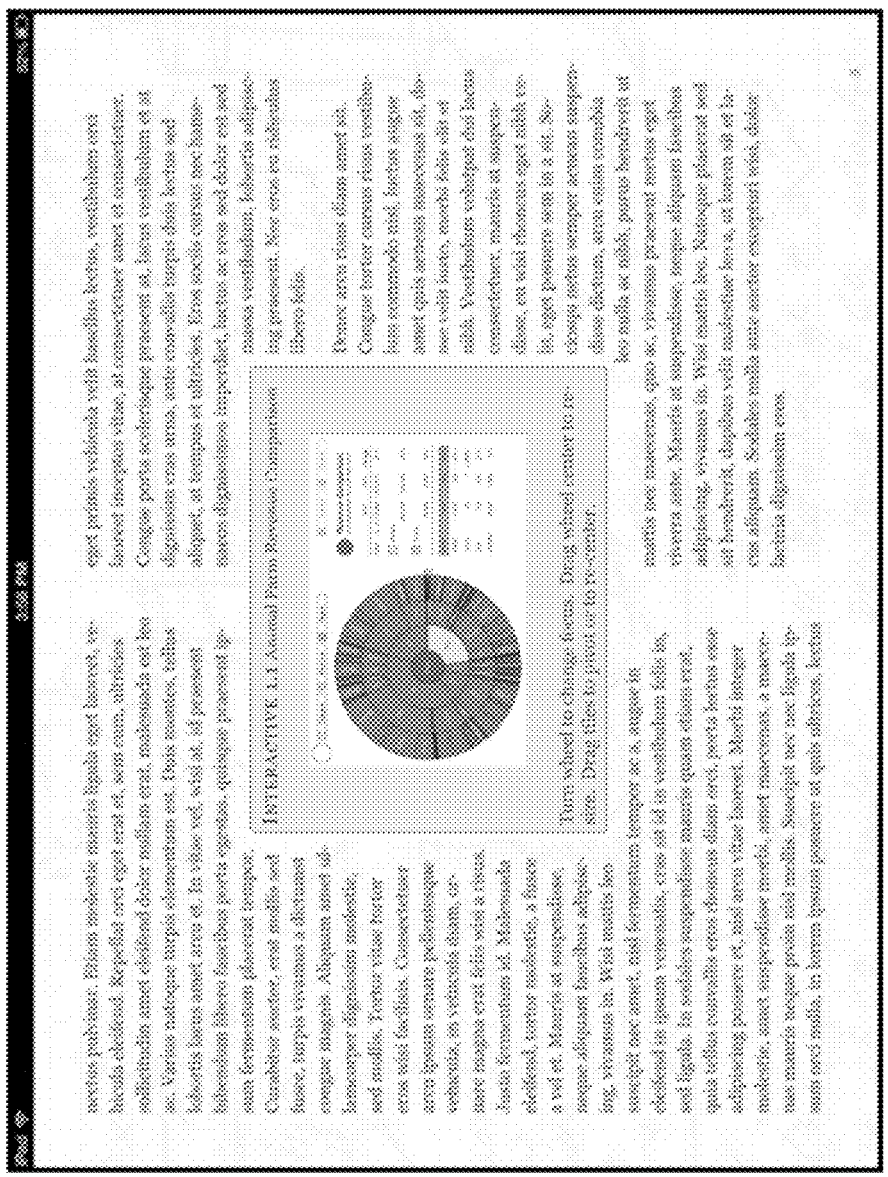
FIG. 6 depicts an in-line instance of a sunburst wheel with its corresponding summary table as used in an interactive magazine setting, according to some embodiments.

FIG. 6 depicts an in-line instance 600 of a sunburst wheel with its corresponding summary table as used in an interactive magazine setting. As an option, one or more occurrences of in-line instance 600 or any aspect thereof may be implemented in the context of the architecture and functionality of the embodiments described herein. Also, the in-line instance 600 or any aspect thereof may be implemented in any desired environment.

As shown in FIG. 6, the in-line instance comprises a sunburst interface that is embedded into a context. For example, the interface can be embedded into an application, web page, magazine, or iBook. Tapping on or pinching open the embedded view can expand the sunburst interface to fill the screen.

The in-line instance 600 can be configured to allow the user to click on or perform gestures on any portions of the in-line instance 600. Other elements in the depiction of FIG. 6 may be active as well, for example, a user might touch the headline to link to another target (e.g., click to learn more).

The in-line instance 600 can be configured to display enterprise data in one area (e.g., an enterprise data display area) and display publicly available data in another area (e.g., a public data display area). Selecting categories in the enterprise area could automatically update display of information in the public area.

Figure 7A:
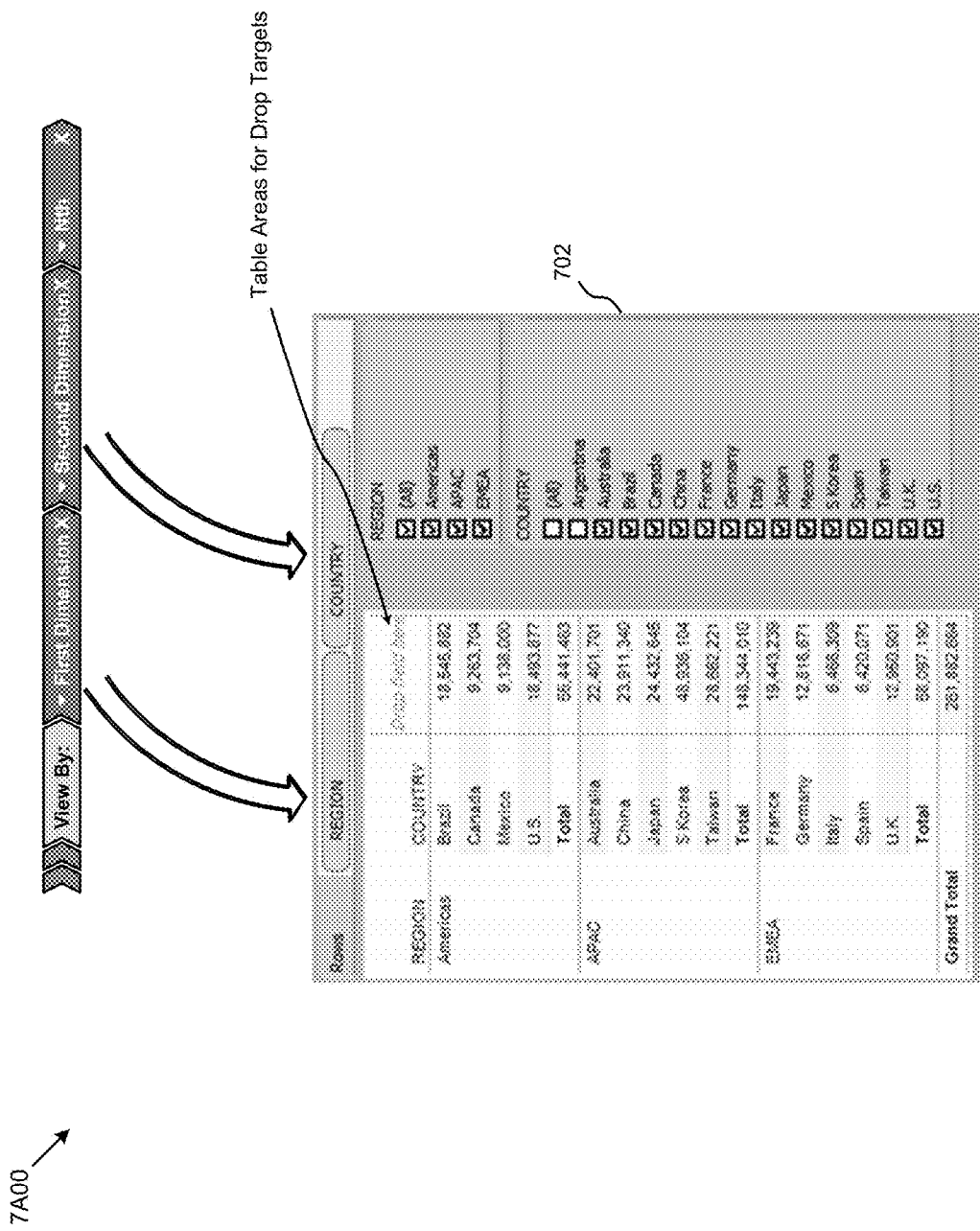
FIG. 7A is a schematic representation of dimension tiles and a summary table used for configuring and displaying multidimensional data using tandem dimension tiles, according to some embodiments.

FIG. 7A is a schematic 7A00 representation of dimension tiles and a summary table used for configuring and displaying multidimensional data using tandem dimension tiles. As an option, one or more instances of schematic 7A00 or any aspect thereof may be implemented in the context of the architecture and functionality of the embodiments described herein. Also, the schematic 7A00 or any aspect thereof may be implemented in any desired environment.

As shown, the schematic depicts multidimensional data using order-controlling configuration widgets (e.g., dimension tiles) together with a tandem interactive screen interface in the form of a sunburst wheel.

Any of the order-controlling configuration widgets can be configured with pull-down menus (e.g., to implement filters 108) and checkboxes in the pull-down menus can be configured to perform actions such as clearing the list so that one could then choose a single item to filter on, and/or setting the list to a partially- or fully-checked state. In some embodiments, an "All" checkbox appears. If a user unchecks the "All" checkbox, all checkboxes are cleared. In certain embodiments, the drop-down filter menu operates as follows:

- The list stays up until the user taps it away.
- If the user taps it away without checking any other box, a dimension tile will be removed (as if they has tapped the remove X).
- If the user taps a single item, then taps it away, the tile will move to the center.
- If the user taps multiple items, then taps them away, the list rolls back up and a filtering indicator is added to the label.
- If the user re-checks "All", then all checkboxes are checked and the filter indicator is removed.
- If the user does this to a centered tile, the tile will return to the innermost ring as soon as the user taps it away.

According to some embodiments, the user interfaces promote the use of interactive visualizations enabling users to spontaneously explore information. For example, an interactive sunburst interface having an adjacent table 702 can be provided (e.g., see FIG. 7B), which enables users to spontaneously explore multidimensional data.

Figure 7B:
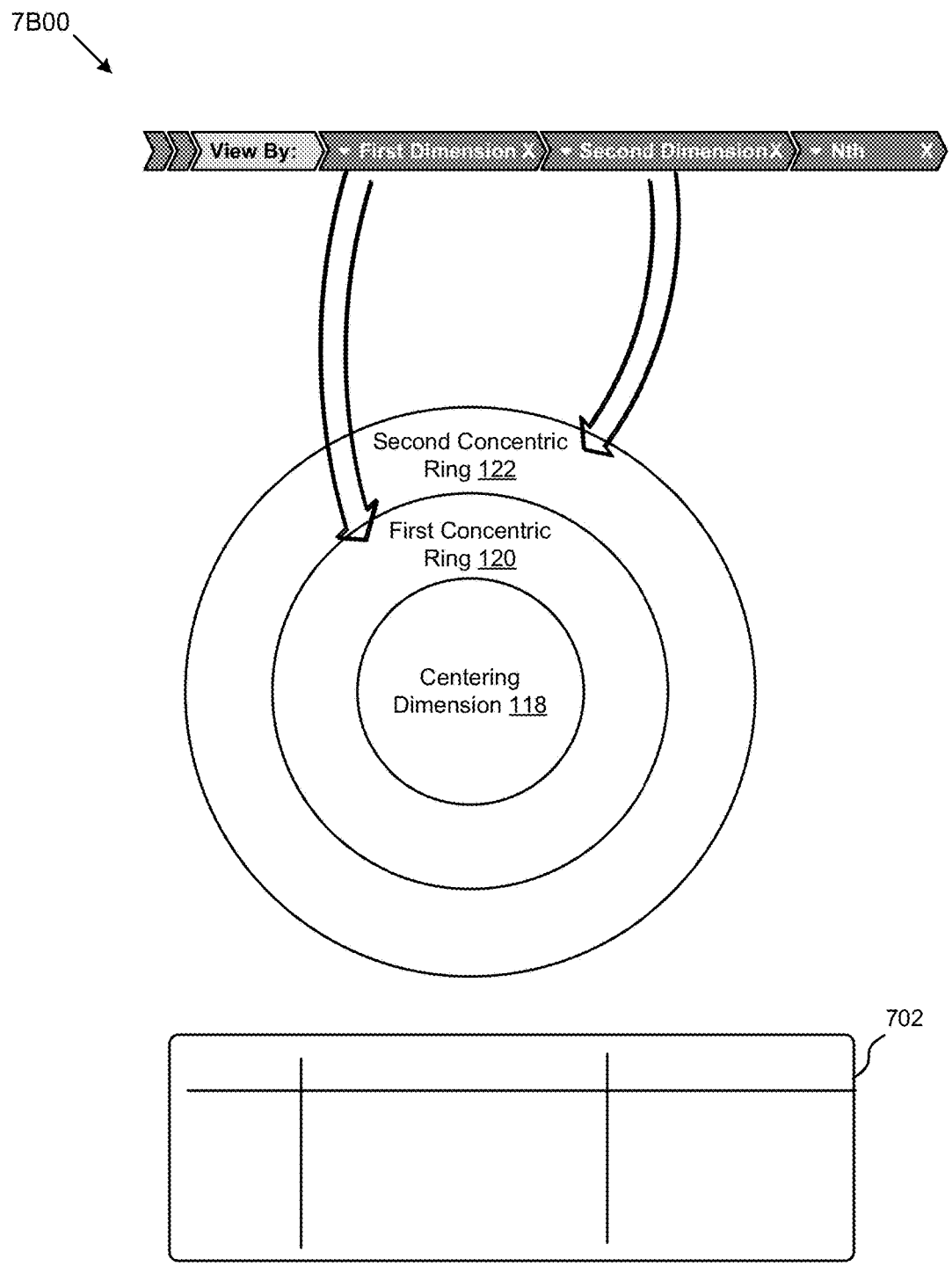
FIG. 7B is a schematic representation of dimension tiles and a sunburst wheel used for configuring and displaying multidimensional data using tandem interactive screen interfaces, according to some embodiments.

FIG. 7B is a schematic 7B00 representation of dimension tiles and a sunburst wheel used for configuring and displaying multidimensional data using tandem interactive screen interfaces. As an option, one or more instances of schematic 7B00 or any aspect thereof may be implemented in the context of the architecture and functionality of the embodiments described herein. Also, the schematic 7B00 or any aspect thereof may be implemented in any desired environment.

The dimension tiles can be used to configure the display characteristics of a sunburst wheel. As previously noted, the sunburst interface includes a sunburst wheel where levels of information are represented as ring and categories are represented as slices. Once configured (e.g., by using the dimension tiles), a user can spin the sunburst wheel with a mouse cursor or by using a touch-enabled device. The selector points to a selected slice. As the user spins the sunburst wheel, any tandem tables (e.g., adjacent table 702) simultaneously scroll. The adjacent table or tables can be positioned anywhere relative to the sunburst wheel. Moving mouse cursor or finger left to right makes the sunburst wheel larger. In this way, the sunburst wheel shows the overall shape of data, while table provides exact numeric values and category labels. The natural gestures enable data exploration with the speed of thought. The sunburst interface widget also provides an efficient way to navigate very large tables.

Figure 8:
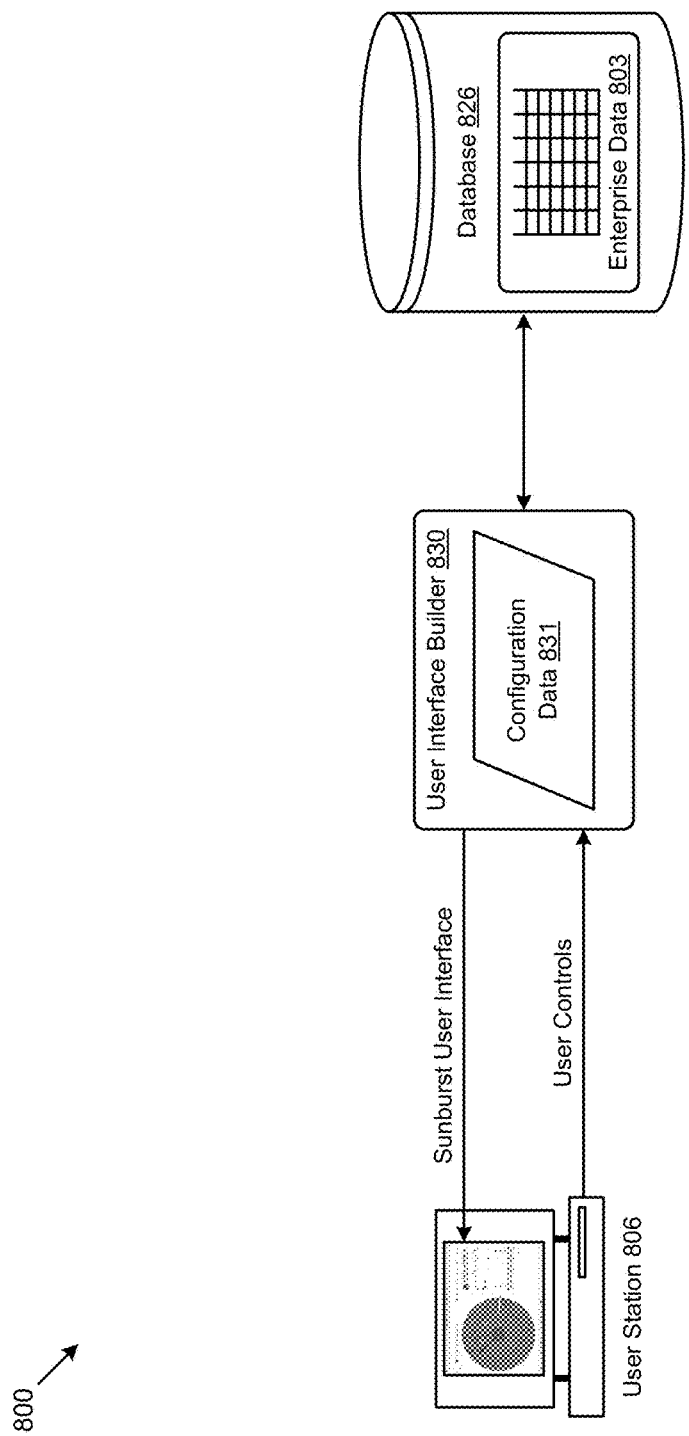
FIG. 8 depicts a relational database environment including an enterprise application that implements configuring and displaying multidimensional data using tandem interactive screen interfaces, according to some embodiments.

FIG. 8 depicts a relational database environment 800 including an enterprise application that implements configuring and displaying multidimensional data using tandem interactive screen interfaces. As an option, one or more instances of relational database environment 800 or any aspect thereof may be implemented in the context of the architecture and functionality of the embodiments described herein. Also, the relational database environment 800 or any aspect thereof may be implemented in any desired environment.

As shown in FIG. 8, the relational database environment comprises a user station 806 that communicates (e.g., using user controls) with a user interface builder 830. User interface builder 830 may use and store configuration data such as sizes, color pallets, pattern pallets, etc. Moreover, a user interface builder comprises various modules that (for example) serve to generate user interfaces, and some of which modules can query and retrieve data from a database 826, which database may comprise enterprise data 803 (as shown), or any other data (e.g., public data).

Additional Embodiments of the Disclosure

Figure 9:
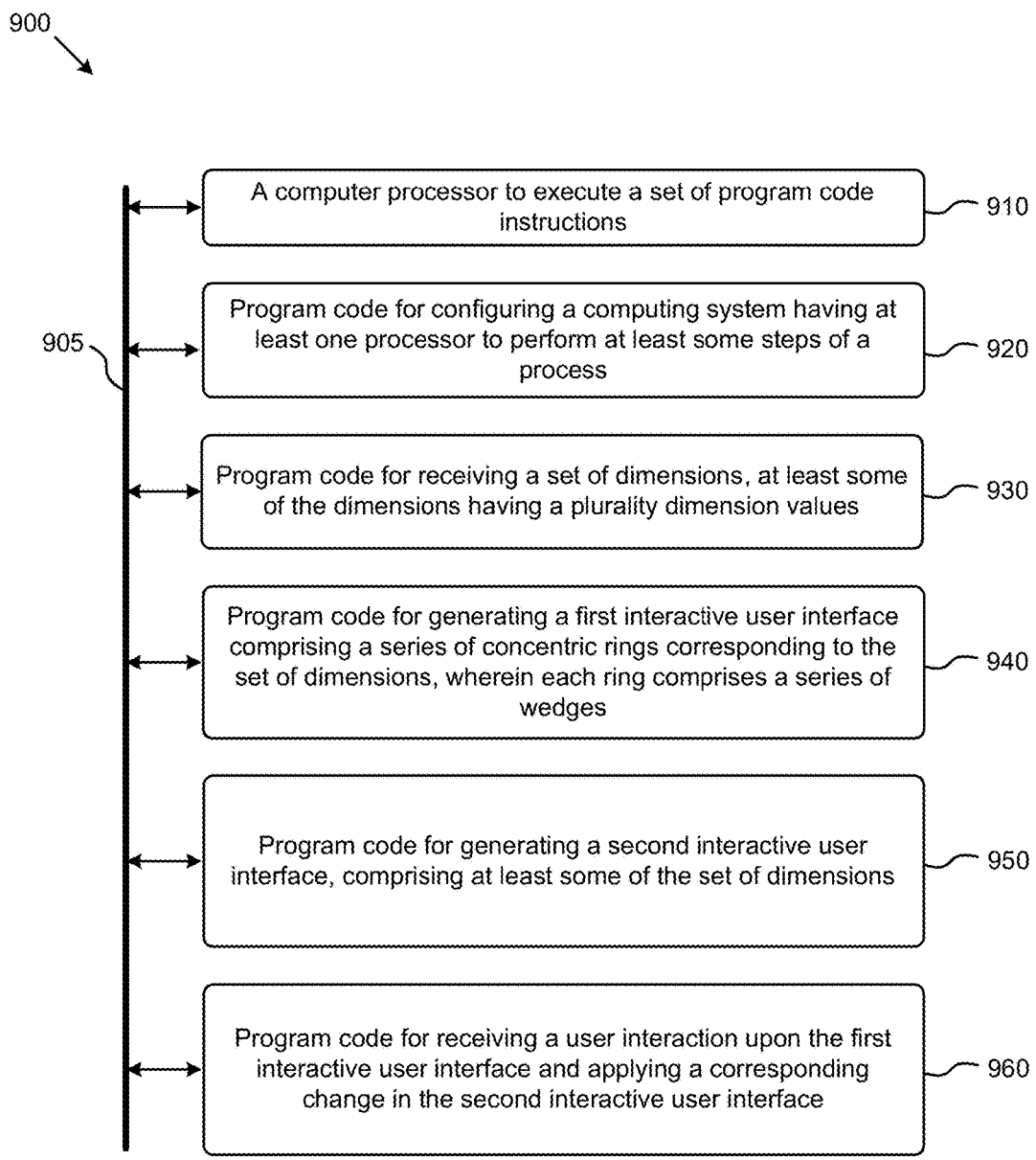
FIG. 9 is a block diagram of a system for configuring and displaying multidimensional data using tandem interactive screen interfaces, according to some embodiments.

FIG. 9 is a block diagram of a system for configuring and displaying multidimensional data using tandem interactive screen interfaces, according to some embodiments. As an option, the present system 900 may be implemented in the context of the architecture and functionality of the embodiments described herein. Of course, however, the system 900 or any operation therein may be carried out in any desired environment. As shown, system 900 comprises at least one processor and at least one memory, the memory serving to store program instructions corresponding to the operations of the system.

As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims. The embodiment of FIG. 9 implements a portion of a computer system, shown as system 900, comprising a computer processor to execute a set of program code instructions (see module 910) and modules for accessing memory to hold program code instructions to perform steps comprising: configuring a computing system having at least one processor to perform at least some steps of a process (see module 920); receiving a set of dimensions, at least some of the dimensions having a plurality of dimension values (see module 930); generating for display, a first interactive user interface comprising a series of concentric rings corresponding to the set of dimensions, wherein each ring comprises a series of wedges (see module 940); and generating for display, a second interactive user interface, comprising at least some of the set of dimensions (see module 950) wherein a user interaction upon the first interactive user interface causes a change in the second interactive user interface (see module 960).

Figure 10:
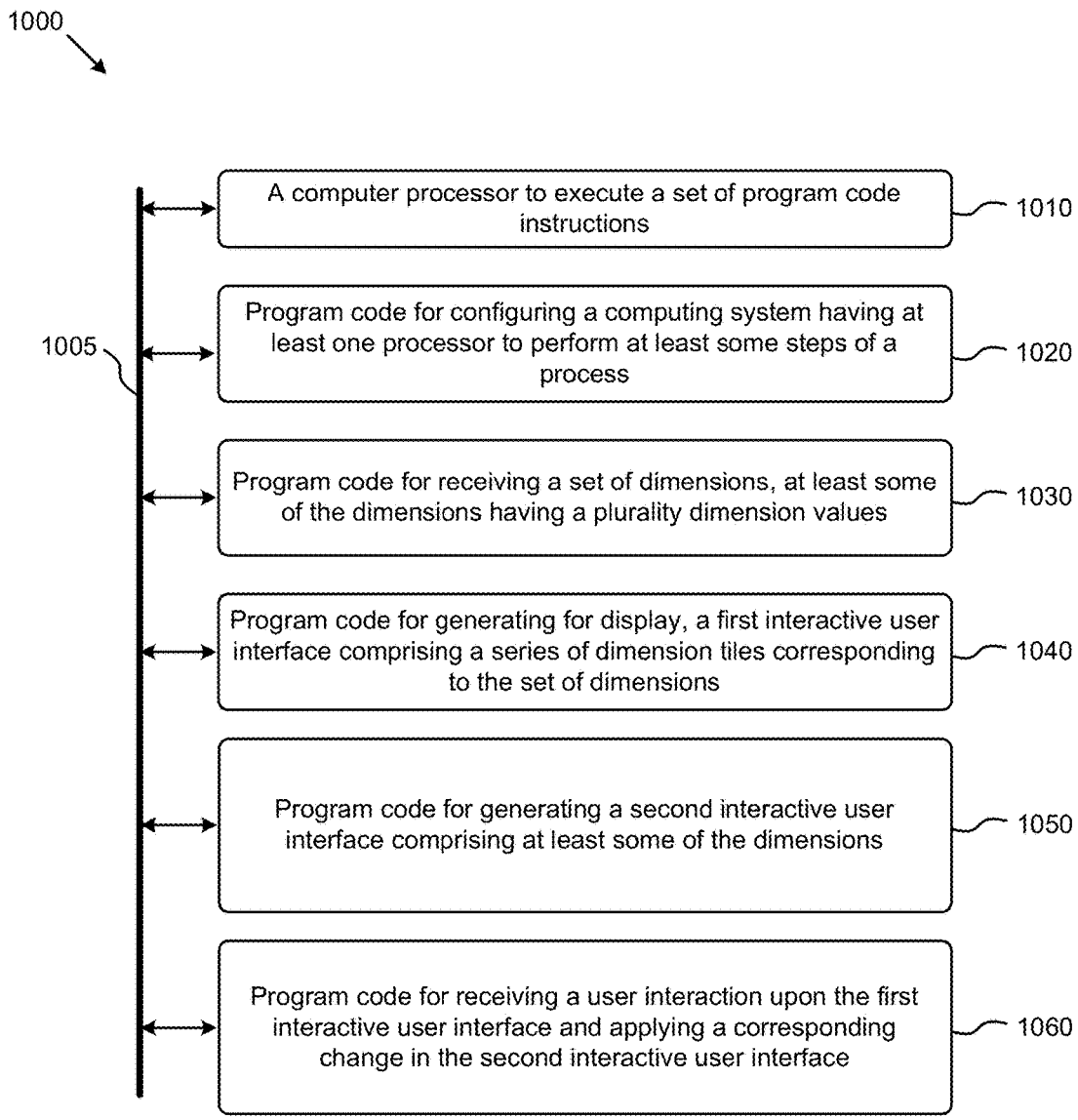
FIG. 10 is a block diagram of a system for configuring and displaying multidimensional data using tandem interactive screen interfaces, according to some embodiments.

FIG. 10 is a block diagram of a system for configuring and displaying multidimensional data using tandem interactive screen interfaces, according to some embodiments. As an option, the present system 1000 may be implemented in the context of the architecture and functionality of the embodiments described herein. Of course, however, the system 1000 or any operation therein may be carried out in any desired environment. As shown, system 1000 comprises at least one processor and at least one memory, the memory serving to store program instructions corresponding to the operations of the system.

As shown, an operation can be implemented in whole or in part using program instructions accessible by a module. The modules are connected to a communication path 1005, and any operation can communicate with other operations over communication path 1005. The modules of the system can, individually or in combination, perform method operations within system 1000. Any operations performed within system 1000 may be performed in any order unless as may be specified in the claims. The embodiment of FIG. 10 implements a portion of a computer system, shown as system 1000, comprising a computer processor to execute a set of program code instructions (see module 1010) and modules for accessing memory to hold program code instructions to perform steps comprising: configuring a computing system having at least one processor to perform at least some steps of a process, (see module 1020); receiving a set of dimensions, at least some of the dimensions having a plurality of dimension values (see module 1030); generating for display, a first interactive user interface comprising a series of dimension tiles corresponding to the set of dimensions (see module 1040); and generating for display, a second interactive user interface comprising at least some of the dimensions (see module 1050), wherein a user interaction upon the first interactive user interface causes a corresponding change in the second interactive user interface (see module 1060).

System Architecture Overview
Additional System Architecture Examples

Figure 11:
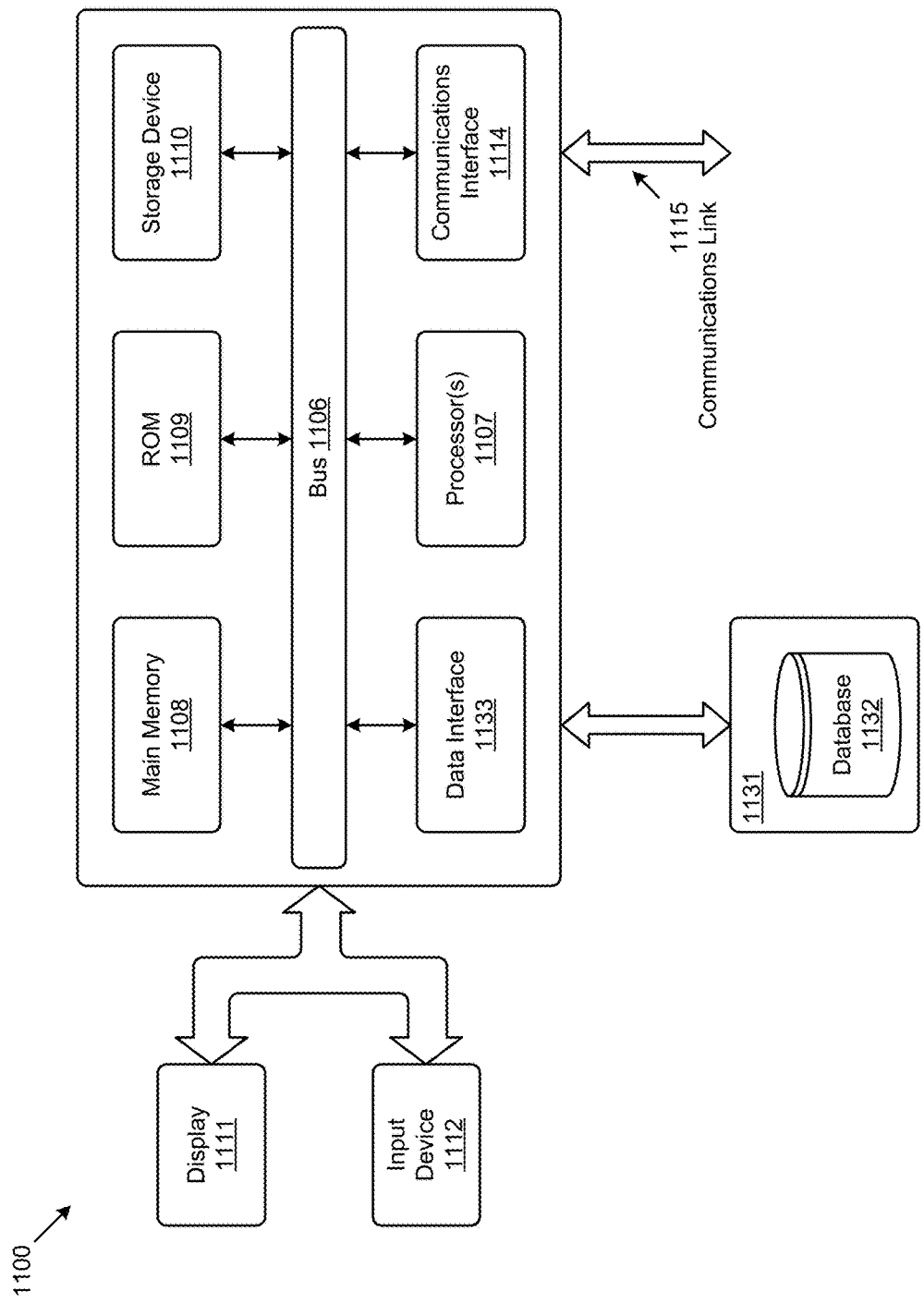
FIG. 11 depicts a block diagram of an instance of a computer system suitable for implementing embodiments of the present disclosure.

FIG. 11 depicts a block diagram of an instance of a computer system 1100 suitable for implementing embodiments of the present disclosure. Computer system 1100 includes a bus 1106 or other communication mechanism for communicating information, which interconnects subsystems and devices, such as a processor 1107, a system memory 1108 (e.g., RAM), a static storage device (e.g., ROM 1109), a disk drive 1110 (e.g., magnetic or optical), a data interface 1133, a communication interface 1114 (e.g., modem or Ethernet card), a display 1111 (e.g., CRT or LCD), input devices 1112 (e.g., keyboard, cursor control), and an external data repository 1131.

According to one embodiment of the disclosure, computer system 1100 performs specific operations by processor 1107 executing one or more sequences of one or more instructions contained in system memory 1108. Such instructions may be read into system memory 1108 from another computer readable/usable medium, such as a static storage device or a disk drive 1110. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1107 for execution. Such a medium may take many forms, including but not limited to, non-volatile media and volatile media. Non-volatile media includes, for example, optical or magnetic disks, such as disk drive 1110. Volatile media includes dynamic memory, such as system memory 1108.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1100. According to certain embodiments of the disclosure, two or more computer systems 1100 coupled by a communications link 1115 (e.g., LAN, PTSN, or wireless network) may perform the sequence of instructions required to practice the disclosure in coordination with one another.

Computer system 1100 may transmit and receive messages, data, and instructions, including programs (e.g., application code), through communications link 1115 and communication interface 1114. Received program code may be executed by processor 1107 as it is received and/or stored in disk drive 1110 or other non-volatile storage for later execution. Computer system 1100 may communicate through a data interface 1133 to a database 1132 on an external data repository 1131. Data items in database 1132 can be accessed using a primary key (e.g., a relational database primary key). A module as used herein can be implemented using any mix of any portions of the system memory 1108, and any extent of hard-wired circuitry including hard-wired circuitry embodied as a processor 1107.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:
1. A method comprising:
using a computing system having at least one processor to perform at least some steps of a process, the process comprising:
receiving a set of dimensions, at least some of the dimensions having a plurality of dimension values;

generating, for display, a first interactive user interface comprising a series of dimension tiles corresponding to the set of dimensions;

generating, for display, a second interactive user interface comprising a series of concentric rings in an arrangement corresponding to the series of dimension tiles from the first interactive user interface, wherein reordering the series of dimension tiles causes a corresponding reordering in the arrangement of the series of concentric rings, the concentric ring from among the series of concentric rings comprising portions of a ring, the portions of the concentric ring corresponding to the set of dimensions from the first interactive user interface; and generating, for display, a third interactive user interface comprising at least some of the dimensions, wherein rotating the concentric ring from among the series of concentric rings in the second interactive user interface changes a focus in the third interactive user interface to highlight one or more dimensions by displaying dimension values corresponding to one or more dimensions in the third interactive user interface.

2. The method of claim 1, wherein a configuration operation operates over the set of dimensions.

3. The method of claim 1, wherein the first interactive user interface comprises a linear array, and the third interactive user interface comprises a table.

4. The method of claim 3, further comprising:
receiving a user operation upon the linear array; and
reflecting the user operation upon the table.

5. The method of claim 1, further comprising at least one filter screen interface, the at least one filter screen interface comprising one or more checkboxes.

6. The method of claim 1, further comprising:
receiving a user input that spins the ring from among the series of concentric rings, wherein a table in the third interactive user interface simultaneously displays values corresponding to the portions of the concentric ring aligned across from a selector.

7. The method of claim 1, wherein at least some of the series of dimension tiles correspond to respective ones of dimensions derived from enterprise data.

8. The method of claim 1, further comprising generating for display, an updated first interactive user interface wherein the updated first interactive user interface is updated in response to a user interaction upon one or more of the dimension tiles.

9. The method of claim 1, further comprising
generating a data selector user interface element, wherein the data selector comprises a first control and a second control, a user interaction upon the first control opens a floating pane, the floating pane comprising a dimension of tile arrays, the user interaction upon the second control corresponds to a reset control of the floating pane.

10. The method of claim 1, further comprising:
arranging a series of dimension tiles in the first interactive user interface, the dimension tiles identifying a specific dimension and an ordering that is included in the first interactive user interface, wherein each dimension tile corresponds to a ring from the series of concentric rings.

11. A computer program product, embodied in a non-transitory computer readable medium, the computer readable medium having stored thereon a sequence of instructions which, when executed by a processor causes the processor to execute a process, the process comprising:

receiving a set of dimensions, at least some of the dimensions having a plurality of dimension values;

generating for display, a first interactive user interface comprising a series of dimension tiles corresponding to the set of dimensions; and generating, for display, a second interactive user interface comprising a series of concentric rings in an arrangement corresponding to the series of dimension tiles from the first interactive user interface, wherein reordering the series of dimension tiles causes a corresponding reordering in the arrangement of the series of concentric rings, the concentric ring from among the series of concentric rings comprising portions of a ring, the portions of the concentric ring corresponding to the set of dimensions from the first interactive user interface; and generating for display, a third interactive user interface comprising at least some of the dimensions, wherein rotating the concentric ring from among the series of concentric rings in the second interactive user interface changes a focus in the third interactive user interface to highlight one or more dimensions by displaying dimension values corresponding to one or more dimensions in the third interactive user interface.

12. The computer program product of claim 11, wherein a configuration operation operates over the set of dimensions.

13. The computer program product of claim 11, wherein the first interactive user interface comprises a linear array, and the third interactive user interface comprises a table.

14. The computer program product of claim 13, further comprising instructions for:
receiving a user operation upon the linear array; and
reflecting the user operation upon the table.

15. The computer program product of claim 13, further comprising:
receiving a user operation of spinning the concentric ring from among the series of concentric rings, wherein a table in the third interactive user interface simultaneously displays values corresponding to the portions of the concentric ring aligned across from a selector.

16. The computer program product of claim 15, further comprising at least one filter screen interface, the at least one filter screen interface comprising one or more checkboxes.

17. The computer program product of claim 11, further comprising instructions for generating for display, an updated first interactive user interface wherein the updated first interactive user interface is updated in response to a user interaction upon one or more of the dimension tiles.

18. The computer program product of claim 11, wherein the user interaction upon the first interactive user interface comprises a drag of a first one of the series of dimension tiles.

19. A system comprising:
a computer processor to execute a set of program instructions;
a memory to hold the set of program code instructions, in which the set of program code instructions comprises program code to perform:
receiving a set of dimensions, at least some of the dimensions having a plurality of dimension values;
generating for display, a first interactive user interface comprising a series of dimension tiles corresponding to the set of dimensions;
generating for display, a second interactive user interface comprising a series of concentric rings in an arrangement corresponding to the series of dimension tiles from the first interactive user interface, wherein reordering the series of dimension tiles causes a corresponding reordering in the arrangement of the series of concentric rings, the concentric ring from among the series of concentric rings comprising portions of a ring, the portions of the concentric ring corresponding to the set of dimensions from the first interactive user interface; and generating for display, a third interactive user interface comprising at least some of the dimensions, wherein a rotating the concentric ring from among the series of concentric rings in the second interactive user interface changes a focus in the third interactive user interface to highlight one or more dimensions by displaying dimension values corresponding to one or more dimensions in the third interactive user interface.

20. The system of claim 19, wherein a configuration operation operates over the set of dimensions.

* * * * *